United States Patent
Hu et al.

(10) Patent No.: US 11,898,803 B2
(45) Date of Patent: Feb. 13, 2024

(54) COOLING PLANT SYSTEM AND METHOD OF OPERATING SAID SYSTEM

(71) Applicants: Agency for Science, Technology and Research, Singapore (SG); Singapore District Cooling Pte Ltd, Singapore (SG)

(72) Inventors: Wuhua Hu, Singapore (SG); Chin Choy Chai, Singapore (SG); Wenxian Yang, Singapore (SG); Rongshan Yu, Singapore (SG)

(73) Assignee: Agency for Science, Technology and Research Singapore District Cooling Pte Ltd, Singapore (SG)

( * ) Notice: Subject to any disclaimer, the term of this patent is extended or adjusted under 35 U.S.C. 154(b) by 370 days.

(21) Appl. No.: 17/286,402

(22) PCT Filed: Oct. 17, 2018

(86) PCT No.: PCT/SG2018/050518
§ 371 (c)(1),
(2) Date: Apr. 16, 2021

(87) PCT Pub. No.: WO2020/081003
PCT Pub. Date: Apr. 23, 2020

(65) Prior Publication Data
US 2021/0396478 A1    Dec. 23, 2021

(51) Int. Cl.
*F28D 20/02* (2006.01)
*G06Q 10/04* (2023.01)
*G06Q 50/06* (2012.01)

(52) U.S. Cl.
CPC .......... *F28D 20/028* (2013.01); *G06Q 10/04* (2013.01); *G06Q 50/06* (2013.01)

(58) Field of Classification Search
CPC ....... F28D 20/028; F28D 20/02; G06Q 10/04; G06Q 50/06; Y02E 60/14
See application file for complete search history.

(56) References Cited

U.S. PATENT DOCUMENTS

| | | | |
|---|---|---|---|
| 2017/0102162 A1* | 4/2017 | Drees | H02J 3/003 |
| 2017/0103483 A1* | 4/2017 | Drees | G06Q 50/06 |
| 2018/0285800 A1* | 10/2018 | Wenzel | G06Q 10/06313 |

FOREIGN PATENT DOCUMENTS

| | | |
|---|---|---|
| CN | 105811397 A | 7/2016 |
| CN | 107609684 A | 1/2018 |

(Continued)

OTHER PUBLICATIONS

Hu et al., Comprehensive Modeling and Joint Optimization of Ice Thermal and Battery Energy Storage with Provision of Grid Services; IEEE Xplore (Year: 2017).*

(Continued)

*Primary Examiner* — Emmanuel E Duke
(74) *Attorney, Agent, or Firm* — Kilpatrick Townsend & Stockton LLP

(57) ABSTRACT

The present disclosure may provide a cooling plant system, a method of operating a cooling plant system and an energy storage and scheduling control system, the cooling plant system comprising one or more cooling towers; one or more thermal energy storage systems coupled to the one or more cooling towers; one or more electrical energy storage systems, the one or more electrical energy storage systems being coupled to the one or more thermal energy storage systems for selectively providing electrical energy to the one or more thermal energy storage systems; and an energy storage and scheduling control system coupled to the one or more thermal energy storage systems and the one or more electrical energy storage systems.

21 Claims, 11 Drawing Sheets

(56) References Cited

FOREIGN PATENT DOCUMENTS

| WO | 2019/191695 A1 | 10/2019 |
| WO | 2019/240667 A1 | 12/2019 |

OTHER PUBLICATIONS

Written Opinion for Application No. 11202103931R from the Intellectual Property Office of Singapore dated May 23, 2022, 7 pages.

Hu W. et al., Comprehensive Modeling and Joint Optimization of Ice Thermal 1-21 and Battery Energy Storage with Provision of Grid Services. Proc. of the 2017 IEEE Region 10 Conference (TENCON), Nov. 8, 2017, pp. 528-533.

Ikeda S. et al., Optimal operation of energy systems including thermal energy storage and battery under different connections. Energy Procedia, Nov. 30, 2015, vol. 78, pp. 2256-2261.

Xu Y. et al., Energy Conversion and Transmission Characteristics Analysis of Ice Storage Air Conditioning System Driven by Distributed Photovoltaic Energy System. *International Journal of Photoenergy*, Sep. 20, 2016, vol. 2016, pp. 1-17.

Zhang G. et al., Optimal Energy Management for Microgrids with Combined Heat and Power (CHP) Generation, Energy Storages, and Renewable Energy Sources, Energies 2017, Aug. 29, 2017, vol. 10, No. 9, pp. 1-18.

International Application No. PCT/SG2018/05018 received an International Search Report and Written Opinion dated Dec. 12, 2018, 10 pages.

\* cited by examiner

COOLING PLANT SYSTEM AND METHOD OF OPERATING SAID SYSTEM

TECHNICAL FIELD

The present disclosure relates broadly to a cooling plant system, to a method of operating a cooling plant system and to an energy storage and scheduling control system.

BACKGROUND

Economics and reliability are two critical considerations in engineering systems. Economics typically characterises the benefits and costs of e.g. constructing, operating and maintaining an engineering system, while reliability typically characterises service quality of the system. In general, an engineering system may be undesirable if either of economics and reliability is not favourable.

In a cooling system, the economics and reliability of the system are typically related to the cost-effectiveness of operating the system and the ability of the system to satisfy cooling demand respectively. Thus, it is recognised that being reliable and economically viable are significant to the survival and success of a cooling system.

It has been recognised that since the cooling demand is typically time-varying and may experience significant fluctuations, multiple resources are typically required to meet the cooling demand. Having multiple resources may raise the operating cost. Furthermore, the consumption of resources may pose significant challenges to maintain the reliability of the cooling system under tight conditions (e.g. when the cooling demand increases significantly).

There have been provided cooling systems that employ and incorporate thermal ice storage systems (ISSs; a type of thermal storage system). Such cooling systems may be provided to assist chillers because it has been recognised that it may not be economical to maintain a desired level of reliability by purchasing and maintaining redundant chillers or water chillers. For example, the ISSs may be charged during time periods when electricity price is comparatively low, and discharged when the electricity price is comparatively high or when additional cooling capacity is needed to meet a peak demand. As compared to redundant backup chillers which may be seldom activated, the flexibility of the ISSs to be able to obtain extra benefits beyond the compulsory service periods present the ISSs as being more cost-effective. Furthermore, as long as the ISSs are appropriately designed and managed such that a desired/certain level of ice is reserved for emergent demands, it has been recognised that the reliability of the cooling system is typically not degraded.

In existing cooling systems that employ ISSs (such as discussed above), the ISSs may be scheduled using heuristic algorithms which are developed from empirical insights or past data/experience/observations. However, it has been recognised by the inventors that such schedules may be conservative leading to underutilisation of the ISSs. The inventors also recognised that underutilisation of the ISSs may weaken the economic reason for having ISSs in cooling systems even though the reliability of the systems may be enhanced.

In addition, with regarding to scheduling, it has also been recognised by the inventors that, in current literature, chiller scheduling problems with thermal storage are being addressed with the assumption that each chiller has only two working modes, i.e., either on or off, and that the ice storage is replaced with chilled water storage.

Hence, in light of the foregoing, there exists a need for a cooling plant system, a method of operating a cooling plant system and an energy storage and scheduling control system that seeks to address at least one of the above problems.

SUMMARY

In an aspect of the present disclosure, there is provided a cooling plant system, the system comprising, one or more cooling towers; one or more thermal energy storage systems coupled to the one or more cooling towers; one or more electrical energy storage systems, the one or more electrical energy storage systems being coupled to the one or more thermal energy storage systems for selectively providing electrical energy to the one or more thermal energy storage systems; and an energy storage and scheduling control system coupled to the one or more thermal energy storage systems and the one or more electrical energy storage systems, the energy storage and scheduling control system being configured to control operations of the one or more thermal energy storage systems and the one or more electrical energy storage systems via a scheduling of the operations per time slot, the operations including the selective provision of electrical energy to the one or more thermal energy storage systems.

The energy storage and scheduling control system may comprise a scheduling module that is configured to receive component models based on the one or more cooling towers, the one or more thermal energy storage systems and the one or more electrical energy storage systems, and further configured to optimise the scheduling of the operations per time slot based on the component models and data obtained from the one or more cooling towers, the one or more thermal energy storage systems and the one or more electrical energy storage systems.

The energy storage and scheduling control system may further comprise a modelling module to obtain the component models based on the one or more cooling towers, the one or more thermal energy storage systems and the one or more electrical energy storage systems.

The energy storage and scheduling control system may be configured to optimise the scheduling based on subjecting the component models to cost constraints and minimising a total net cost based on the component models.

The energy storage and scheduling control system may be configured to optimise the scheduling based on the component models in a stepwise manner.

The one or more electrical energy storage systems may be capable of providing frequency regulation to a power grid, based on the scheduling of the operations per time slot provided by the energy storage and scheduling control system.

The one or more electrical energy storage systems may be capable of providing a contingency reserve service to a power grid to compliment the one or more thermal energy storage systems in case of a contingency, based on the scheduling of the operations per time slot provided by the energy storage and scheduling control system.

In another aspect of the present disclosure, there is provided a method of operating a cooling plant system, the method comprising providing one or more cooling towers; coupling one or more thermal energy storage systems to the one or more cooling towers; coupling one or more electrical energy storage systems to the one or more thermal energy storage systems; selectively providing electrical energy to the one or more thermal energy storage systems using the one or more electrical energy storage systems; coupling an energy storage and scheduling control system to the one or more thermal energy storage systems and the one or more electrical energy storage systems; and controlling operations of the one or more thermal energy storage systems and the one or more electrical energy storage systems using a scheduling of the operations per time slot, the operations including the step of selectively providing electrical energy to the one or more thermal energy storage systems.

The method may further comprise receiving, using a scheduling module of the energy storage and scheduling control system, component models based on the one or more cooling towers, the one or more thermal energy storage systems and the one or more electrical energy storage systems; obtaining data from the one or more cooling towers, the one or more thermal energy storage systems and the one or more electrical energy storage systems; and optimising the scheduling of the operations per time slot based on the component models and the data obtained from the one or more cooling towers, the one or more thermal energy storage systems and the one or more electrical energy storage systems.

The method may further comprise using a modelling module of the energy storage and scheduling control system to obtain the component models based on the one or more cooling towers, the one or more thermal energy storage systems and the one or more electrical energy storage systems.

The method may further comprise optimising the scheduling based on subjecting the component models to cost constraints and minimising a total net cost based on the component models at the energy storage and scheduling control system.

The method may further comprise optimising the scheduling based on the component models in a stepwise manner at the energy storage and scheduling control system.

The method may further comprise providing frequency regulation to a power grid using the one or more electrical energy storage systems, based on the scheduling of the operations per time slot provided by the energy storage and scheduling control system to the one or more electrical energy storage systems.

The method may further comprise providing a contingency reserve service to a power grid using the one or more electrical energy storage systems to compliment the one or more thermal energy storage systems in case of a contingency, based on the scheduling of the operations per time slot provided by the energy storage and scheduling control system to the one or more electrical energy storage systems.

In yet another aspect of the present disclosure, there is provided an energy storage and scheduling control system, the energy storage and scheduling control system being capable of coupling to one or more cooling towers, to one or more thermal energy storage systems and to one or more electrical energy storage systems; the energy storage and scheduling control system being configured to control operations of the one or more thermal energy storage systems and the one or more electrical energy storage systems via a scheduling of the operations per time slot, the operations including selective provision of electrical energy to the one or more thermal energy storage systems.

The energy storage and scheduling control system may comprise a scheduling module being capable of receiving component models based on the one or more cooling towers, the one or more thermal energy storage systems and the one or more electrical energy storage systems, and further being capable of optimising the scheduling of the operations per time slot based on the component models and data obtained from the one or more cooling towers, the one or more thermal energy storage systems and the one or more electrical energy storage systems.

The energy storage and scheduling control system may further comprise a modelling module being capable of obtaining the component models based on the one or more cooling towers, the one or more thermal energy storage systems and the one or more electrical energy storage systems.

The scheduling module may be further being capable of optimising the scheduling based on subjecting the component models to cost constraints and minimising a total net cost based on the component models.

The scheduling module may be further being capable of optimising the scheduling based on the component models in a stepwise manner.

The energy storage and scheduling control system may be capable of controlling the one or more electrical energy storage systems to provide frequency regulation to a power grid, based on the scheduling of the operations per time slot provided by the energy storage and scheduling control system.

The energy storage and scheduling control system may be capable of controlling the one or more electrical energy storage systems to provide a contingency reserve service to a power grid to compliment the one or more thermal energy storage systems in case of a contingency, based on the scheduling of the operations per time slot provided by the energy storage and scheduling control system.

BRIEF DESCRIPTION OF THE DRAWINGS

Exemplary embodiments of the invention will be better understood and readily apparent to one of ordinary skill in the art from the following written description, by way of example only, and in conjunction with the drawings, in which.

DETAILED DESCRIPTION

Figure 1A:
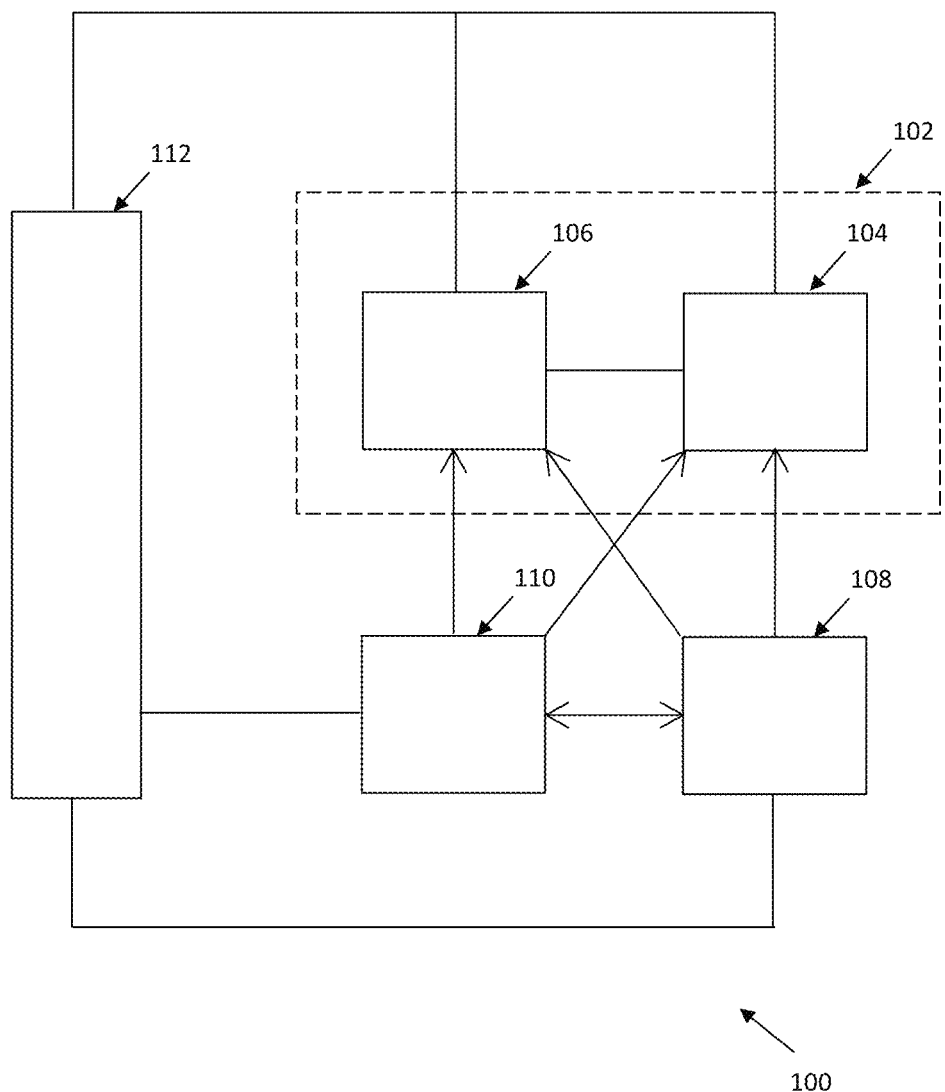
FIG. 1A is a schematic diagram of a cooling plant system in an exemplary embodiment.

FIG. 1A is a schematic diagram of a cooling plant system in an exemplary embodiment. In the exemplary embodiment, the cooling plant system 100 comprises a cooling system 102 that in turn comprises one or more cooling towers (CTs) 104 and one or more thermal energy storage systems (TESSs) 106 coupled to the one or more CTs 104. The cooling plant system 100 may also comprise a power source 108 that is coupled to the cooling system 102. The power source 108 may provide power to the one or more CTs 104 and the one or more TESSs 106. In the exemplary embodiment, the cooling plant system 100 further comprises one or more electrical energy storage systems (EESSs) 110. The one or more EESSs 110 may be coupled to the power source 108 and is capable of charging and/or discharging with respect to the power source 108. The one or more EESSs 110 may provide power to the one or more CTs 104. The one or more EESSs 110 is coupled to the one or more TESSs 106, and the one or more EESSs 110 is capable of selectively providing electrical energy to the one or more TESSs 106. In the exemplary embodiment, the cooling plant system 100 further comprises an energy storage and scheduling control system 112. The energy storage and scheduling control system 112 is coupled to the one or more EESSs 110 and the cooling system 102 (or at least the one or more TESSs 106). The energy storage and scheduling control system 112 is configured to control the operations and/or scheduling of the one or more TESSs 106. The energy storage and scheduling control system 112 may also be configured to control the operations and/or scheduling of the one or more CTs 104. The energy storage and scheduling control system 112 is also configured to control the operations and/or scheduling of the one or more EESSs 110.

In the exemplary embodiment, the energy storage and scheduling control system 112 is configured to control operations of at least the one or more TESSs 106 and the EESSs 110 via a scheduling of the operations per time slot, the operations including the selective provision of electrical energy to the one or more thermal energy storage systems.

In the exemplary embodiment, the energy storage and scheduling control system 112 may comprise a scheduling module (not shown) that is configured to receive component models based on the one or more CTs 104, the one or more TESSs 106 and the one or more EESSs 110, and the scheduling module is further configured to optimise the scheduling of the operations per time slot based on the component models and data obtained from the one or more CTs 104, the one or more TESSs 106 and the one or more EESSs 110.

In the exemplary embodiment, the energy storage and scheduling control system 112 may further comprise a modelling module (not shown) to obtain the component models based on the one or more CTs 104, the one or more TESSs 106 and the one or more EESSs 110.

In the exemplary embodiment, the energy storage and scheduling control system 112 may be configured to optimise the scheduling based on subjecting the component models to cost constraints and minimising a total net cost based on the component models. The cost constraints may take into account factors such as physics and dynamics of the components of the cooling plant system. Refer e.g. to equation (50) below.

In the exemplary embodiment, the energy storage and scheduling control system 112 may be configured to optimise the scheduling based on the component models in a stepwise manner.

In the exemplary embodiment, the one or more EESSs 110 is capable of providing frequency regulation to a power grid, based on the scheduling of the operations per time slot provided by the energy storage and scheduling control system 112.

In the exemplary embodiment, the one or more EESSs 110 is capable of providing a contingency reserve service to a power grid to compliment the one or more TESSs 106 in case of a contingency, based on the scheduling of the operations per time slot provided by the energy storage and scheduling control system 112.

Figure 1B:
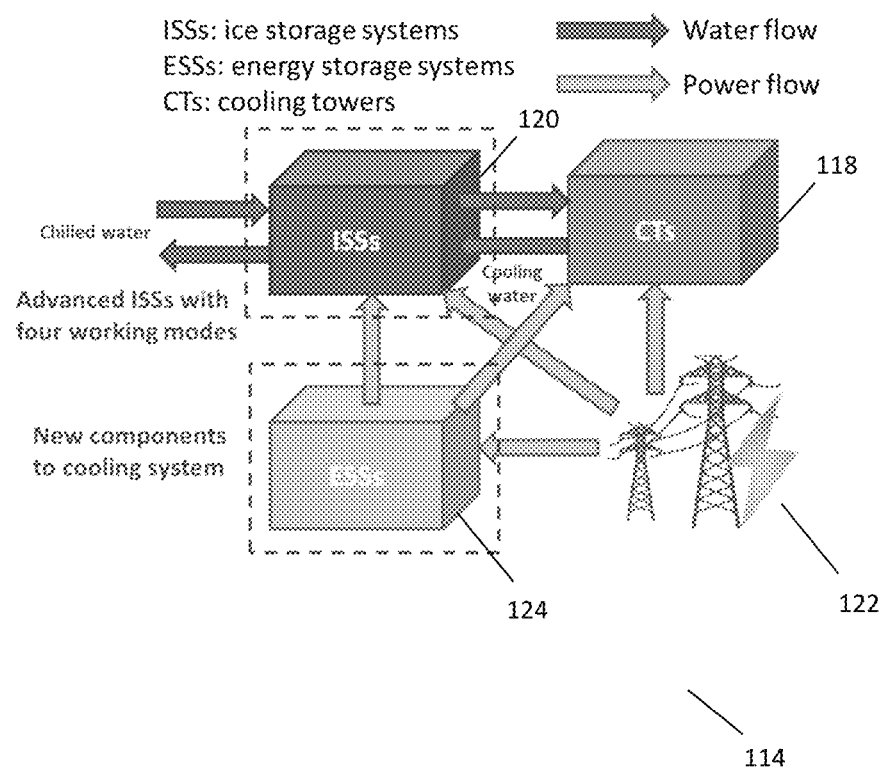
FIG. 1B is a schematic diagram of a cooling plant system in an exemplary embodiment.

FIG. 1B is a schematic diagram of a cooling plant system in an exemplary embodiment. In this exemplary embodiment, the cooling plant system 114 is substantially similar to the cooling plant system 100 described with reference to FIG. 1A. The cooling plant system 114 comprises one or more CTs 118 and one or more thermal energy storage systems e.g. in the form of ice storage systems (ISSs) 120 coupled to the one or more CTs 118. The cooling plant system 114 of FIG. 1B also comprises a power source connection e.g. a power grid 122 (compare e.g. power source 108 of FIG. 1A). The power grid 122 is coupled to the one or more CTs 118 and the one or more ISSs 120. The cooling plant system 114 further comprises one or more electrical energy storage systems e.g. in the form of battery energy storage systems (ESSs) 124. The one or more ESSs 124 is coupled to the one or more CTs 118 and the one or more ISSs 120. The power grid 122 is also coupled to the one or more ESSs 124. In the exemplary embodiment, the cooling plant system 114 further comprises an energy storage and scheduling control system (not shown) that is configured to control the operations and/or scheduling of the components of the cooling plant system 114 e.g. the one or more CTs 118, the one or more ISSs 120 and the one or more ESSs 124.

In the exemplary embodiment, the energy storage and scheduling control system comprises a general modelling module and an optimisation algorithm module to jointly optimise the scheduling of the one or more ISSs and the one or more ESSs in the cooling plant system. The cooling plant system may be a district cooling plant with active support to grid ancillary services. The energy storage and scheduling control system may use an optimisation model that is developed based on the physics of the components of the cooling plant system as well as based on operational/ experimental data of the components. The optimisation algorithm module may perform optimisation in such a way that a solution can be obtained online to meet a periodic scheduling criteria while the optimality of the solution is maintained to a maximum extent.

Figure 2A:
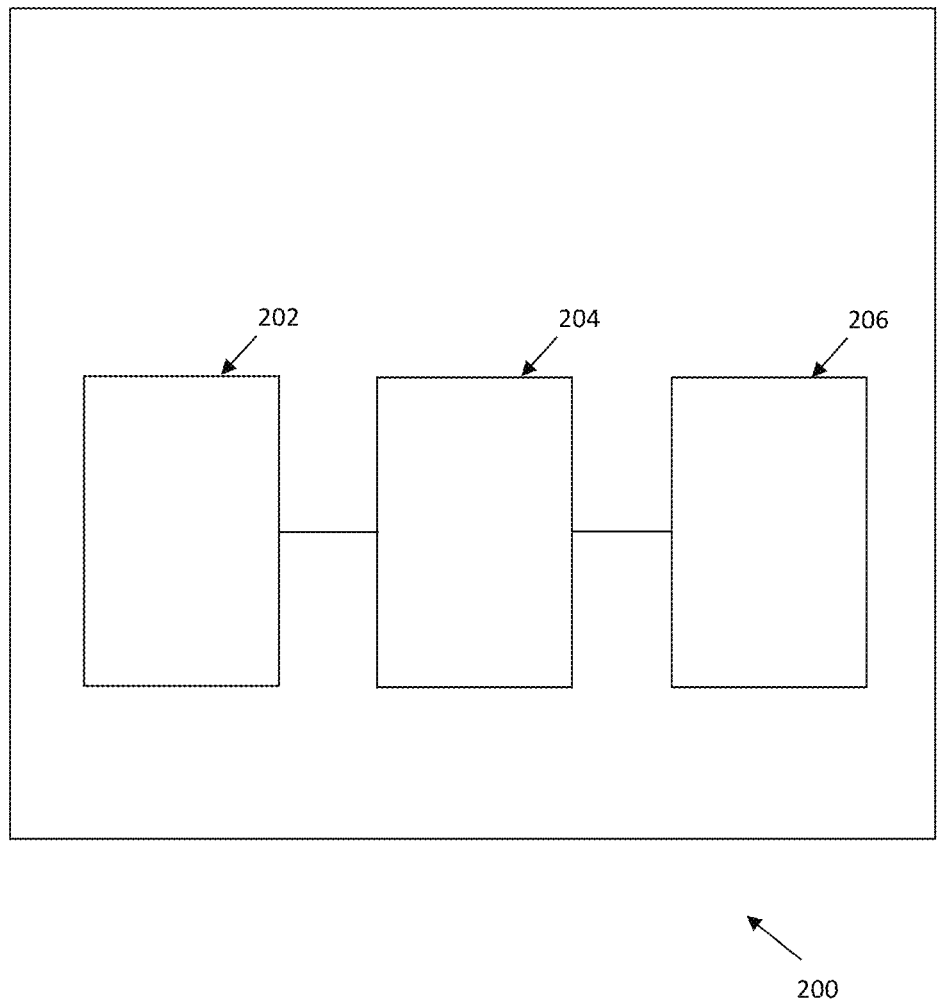
FIG. 2A is a schematic block diagram of an energy storage and scheduling control system in an exemplary embodiment.

FIG. 2A is a schematic block diagram of an energy storage and scheduling control system in an exemplary embodiment.

In the exemplary embodiment, the energy storage and scheduling control system 200 comprises a modelling module 202 and a scheduling module 204 coupled to the modelling module 202. The energy storage and scheduling control system 200 further comprises a data module 206 coupled to the scheduling module 204.

In the exemplary embodiment, the modelling module 202 is, for example, a modelling unit that provides component models (e.g. mathematical models) of a cooling plant system e.g. based on parameter settings of the different components of the cooling plant system.

In the exemplary embodiment, the data module 206 is capable of computing (and/or forecasting) and providing various data inputs to specify the models (provided by the modelling module 202), e.g. by specifying model parameters, over a given scheduling time horizon.

In the exemplary embodiment, the scheduling module 204 is configured to obtain one or more inputs from the modelling module 202 (e.g. component models) and/or the data module 206 (e.g. data inputs to specify model parameters) respectively. The scheduling module 204 is capable of optimising the schedules of the components of the cooling plant system, e.g. one or more ISSs, one or more ESSs and/or one or more CTs, for a given time horizon based on the obtained one or more inputs.

For example, scheduling by the scheduling module 204 may allow one or more ISSs and/or one or more ESSs to charge/discharge appropriately, according to output schedule(s) provided by the scheduling module 204, to participate in ancillary markets while minimising the operating cost of a cooling plant system.

Figure 2B:
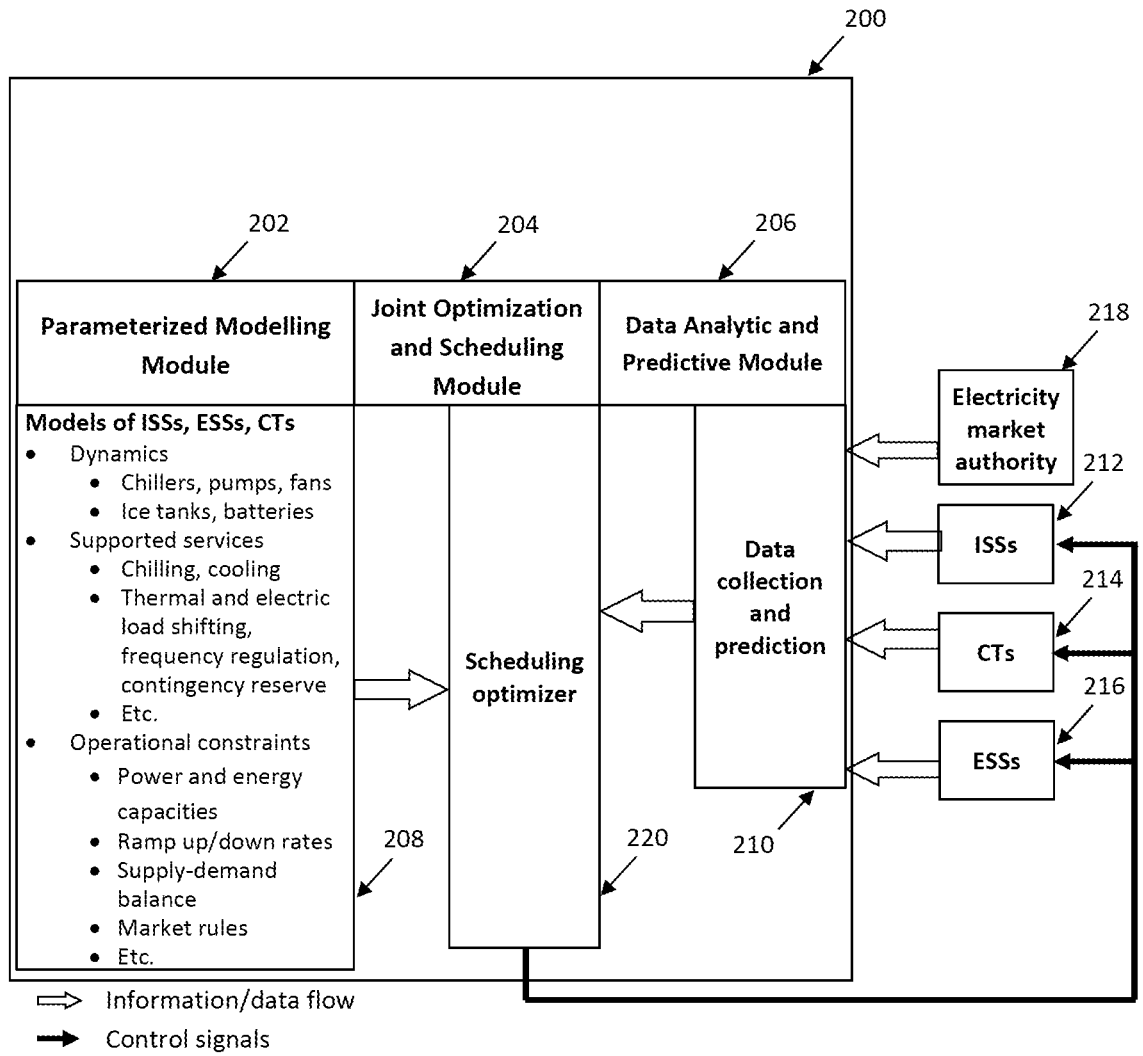
FIG. 2B is a schematic block diagram for illustrating modules of an energy storage and scheduling control system in an exemplary embodiment.

FIG. 2B is a schematic block diagram for illustrating modules of an energy storage and scheduling control system in an exemplary embodiment.

The energy storage and scheduling control system of this exemplary embodiment is an example of the energy storage and scheduling control system 200 described with respect to FIG. 2A. Like numerals are used for exemplary implementations of modules described in FIG. 2A.

In the exemplary embodiment, the modelling module 202 is in the form of a parameterised modelling module 202 that comprises a modelling component 208. The modelling component 208 is configured to provide component models of the one or more ISSs, the one or more ESSs and/or the one or more CTs (as e.g. mathematical models). In the exemplary embodiment, the component models may be provided based on dynamics of components of the cooling plant system (e.g. chillers, pumps, fans, ice storage tanks and batteries), supported services (e.g. chilling, cooling, thermal and electric load shifting, frequency regulation, contingency reserve) and/or operational constraints (e.g. power and energy capacities, ramp up/down rates, supply-demand balance, market rules).

In the exemplary embodiment, the data module 206 is in the form of a data analytic and predictive module 206 that comprises a data collection and prediction component 210. The data collection and prediction component 210 is configured to obtain data from, for example but not limited to, one or more ISSs 212, one or more CTs 214 and/or one or more ESSs 216 of a cooling plant system. In the exemplary embodiment, the data collection and prediction component 210 is further configured to collect data from an electricity market authority 218.

In the exemplary embodiment, the scheduling module 204 is in the form of a joint optimisation and scheduling module 204 that comprises a scheduling optimiser component 220. The scheduling optimiser component 220 is configured to output schedules(s) that have been processed for optimality to the one or more ISSs 210, the one or more CTs 212 and/or the one or more ESSs 214 of the cooling plant system based on the one or more inputs received from the parameterised modelling module 202 and/or the data analytic and predictive module 206. Thus, the scheduling optimiser component 220 may control the operations of the one or more ISSs 210, the one or more CTs 212 and the one or more ESSs 214 of the cooling plant system e.g. scheduling power signals to the ISSs, ESSs etc.

In the exemplary embodiment, the parameterised modelling module 202 may further comprise a database component (not shown). The database component may be configured to store therein the component models of the one or more ISSs, the one or more ESSs and/or the one or more CTs. In the exemplary embodiment, the scheduling optimiser 220 may be configured to obtain the one or more inputs from the parameterised modelling module 202 by accessing the database component of the parameterised modelling module 202.

In the exemplary embodiment, the parameterised modelling module 202 may be coupled to an input module (not shown). A user may input one or more component models (in the form of e.g. mathematical models) characterising the one or more ISSs, the one or more ESSs and/or the one or more CTs. Alternatively or additionally, the user may modify the one or more component models provided by the parameterised modelling module 202 via the input module. In the exemplary embodiment, the inputted and/or modified component models may be stored in the parameterised modelling module 202.

Alternatively or additionally, component models may also be initially already provided in the parameterised modelling module 202. As yet another alternative or addition, the component models may also be developed using algorithms or artificial intelligence (AI).

Figure 3:
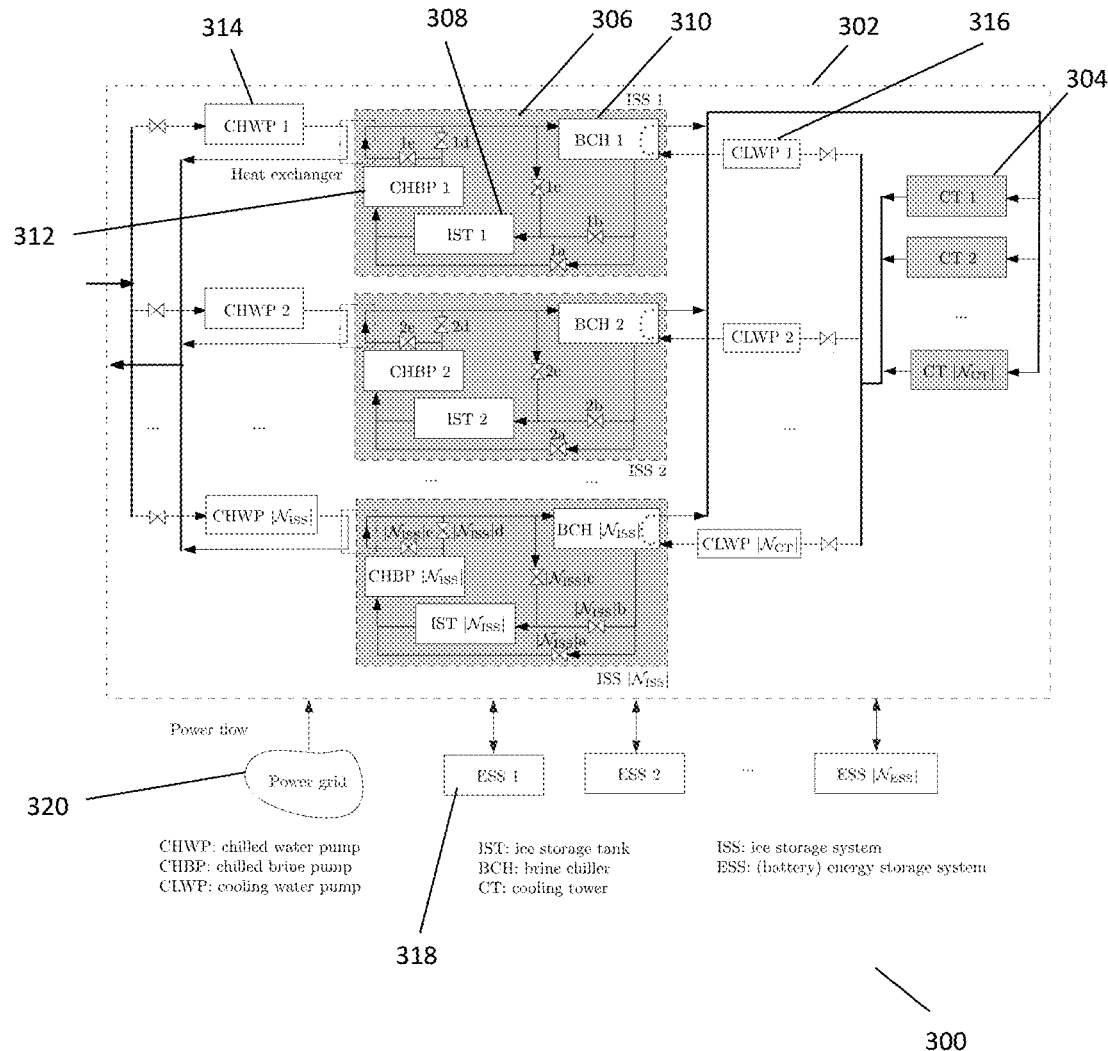
FIG. 3 is a schematic drawing of a cooling plant system in an exemplary embodiment.

FIG. 3 is a schematic drawing of a cooling plant system in an exemplary embodiment.

In the exemplary embodiment, the cooling plant system 300 comprises a cooling system 302 which in turn comprises one or more CTs (e.g. CT 1 304) and one or more ISSs (e.g. ISS 1 306). In the exemplary embodiment, each ISS in the cooling system 302 comprises an ice storage tank (e.g. IST 1 308) and a brine chiller (e.g. BCH 1 310) connected to a chilled brine pump (e.g. CHBP 1 312). Each ISS is also connected to a chilled water pump (e.g. CHWP 1 314) which is provided to cool the ISS. A cooling water pump (e.g. CLWP 1 316) is disposed between the one or more CTs and the one or more ISSs. In the exemplary embodiment, the cooling system 302 is coupled to one or more ESSs (e.g. ESS 1 318) and a power grid 320. It will be appreciated that the exemplary embodiments are not limited to the above described components and may include either more or less of the above described components.

In the description below, a parameterised modelling module is described followed by a description of a data analytic and predictive module which is in turn followed by a description of a joint optimisation and scheduling module.

In the exemplary embodiment, a parameterised modelling module (e.g. parameterised modelling module 202 of FIG. 2B) of an energy storage and scheduling control system (not shown) may be configured to develop/provide one or more individual models of each ISS, ESS and CT in the cooling plant system 300 to model the cooling plant system 300. In the exemplary embodiment, each model characterises the dynamics of a physical unit (e.g. an ISS or ESS), the services supported by the unit and/or the operational constraints that the unit is subject to. As an example, the ISSs are modelled followed by the CTs and the ESSs.

In the exemplary embodiment, each ISS works in one of four working modes, depending on the statuses of the five valves in the ISS. In a first mode or an ice built ("ib") mode, the brine chiller is used to build ice in the ice storage tank. No chilling is provided to external load demand in this mode. In a second mode or a chiller and ice storage series chilling ("Sc") mode, the brine chiller is piped in series with the ice storage tank. In this mode, the returning chilled water is first cooled by the brine chiller and then by the ice storage tank. In a third mode or a chiller and ice storage parallel chilling ("pc") mode, the brine chiller and ice storage tank are operated in parallel to provide chilled water. The ice storage tank or the brine chiller may be turned off in this mode. In a fourth mode or a dormant mode, both the brine chiller and the ice storage tank are stopped from working. No chilled water is supplied by the ISS in this mode.

Let $$M \triangleq \{ib, sc, pc\}$$

which collects the three modes when the brine chiller is active i.e., besides the dormant mode. $\delta_{i,t}^{ib}, \delta_{i,t}^{sc}, \delta_{i,t}^{pc} \in \{0, 1\}$ is introduced to indicate whether a brine chiller i is working in the corresponding modes. If none of these binaries is equal to one, then it means that the chiller is in the dormant mode. The three indicators satisfy $$\sum_{x \in M} \delta_{i,t}^x \leq 1, \qquad (1)$$

that is, a brine chiller i is constrained in that it cannot work in any two modes simultaneously. The aggregate chilling demand allocated to all ISSs is assumed to be given as $q_t$ for time slot t. The load distributed to ISS i is denoted $q_{i,t}$, which satisfies $$\sum_{i \in N_{ISS}} q_{i,t} = q_t, \qquad (2)$$

Next, the ice storage tanks, brine chillers and associated pumps are modelled.

In the exemplary embodiment, the ice storage tank of each ISS is modelled as a receiver having water and ice in thermal equilibrium. Let the chilling energy capacity of ice storage tank i be denoted by $Q_i^{cap}$. The charging (and discharging) power is denoted by $q_{i,t}^c$ (and $q_{i,t}^d$), and the charging (and discharging) efficiency is denoted by $\gamma_i^c$ (and $\gamma_i^d$). The state of charge (SOC) of the ice storage tank, denoted by $\varepsilon_{i,t}$, is defined as the ratio of the remaining chilling energy to the chilling energy capacity. The dynamics of the ice storage tank may be characterised by the SOC evolution $$\varepsilon_{i,t} = \varepsilon_{i,t-1} + T_s(\gamma_i^c q_{i,t}^c - q_{i,t}^d/\gamma_i^d)/Q_i^{cap}. \qquad (3)$$

It has been recognised by the inventors that the power variables and the SOC satisfy the following constraints $$\delta_{i,t}^{ib} q_{i,min}^c \leq q_{i,t}^c \leq \delta_{i,t}^{ib} q_{i,max}^c,$$

$$\delta_{i,t}^{sc} q_{i,min}^d \leq q_{i,t}^d \leq (1 - \delta_{i,t}^{ib}) q_{i,max}^d, \qquad (4)$$

$$-r_{i,down}^c \leq q_{i,t}^c - q_{i,t-1}^c \leq r_{i,up}^c,$$

$$-r_{i,down}^d \leq q_{i,t}^d - q_{i,t-1}^d \leq r_{i,up}^d, \qquad (5)$$

$$\varepsilon_{i,min} \leq \varepsilon_{i,t} \leq \varepsilon_{i,max}. \qquad (6)$$

Constraint (4) imposes the ice charging and discharging limits (specified by the pairs $\{q_{i,min}^c, q_{i,max}^c\}$ and $\{q_{i,min}^d, q_{i,min}^d\}$, respectively), and also enforces the constraint that charging may only take place in the ice building mode and discharging may only take place in the other two non-dormant modes or (i) the chiller and ice storage series chilling mode and (ii) the chiller and ice storage parallel chilling mode. The constraint also imposes a minimum discharging rate if the ice storage works in the series chilling mode. Constraint (5) imposes ramp rate limits. In constraint (6), the SOC limits $\Pi_{i,min}$ and $\varepsilon_{i,max}$ are enforced for protecting the ISS from being overly discharged or charged.

In the exemplary embodiment, the power consumption level of an ice storage tank may be mainly influenced by the chilled brine pump which is used to pump the chilled brine flowing through the ice storage tank for charging or discharging the tank.

For the brine chillers, in the exemplary embodiment, in each brine chiller $i \in N_{ISS}$, the brine chiller has multiple compressors, some of which are activated only in certain modes. Thus, the chilling capacity of the brine chiller and the corresponding energy consumption model are mode-dependent. Let the minimum and maximum chilling powers be given by the pair $\{q_{i,min}^{chl,x}, q_{i,max}^{chl,x}\}$ for the brine chiller i working in mode $x \in M$. Then, the chilling power of the brine chiller i working in mode $x \in M$ satisfy $$\delta_{i,t}^x q_{i,min}^{chl,x} \leq q_{i,t}^{chl,x} \leq \delta_{i,t}^x q_{i,max}^{chl,x}. \qquad (7)$$

In the exemplary embodiment, the brine chiller has a ramp up rate limit of $r_{i,up}^{chl,x}$ and a ramp down rate limit of $r_{i,down}^{chl,x}$ under working mode $x \in M$. The chilling power satisfies the following ramp constraint, $$-\sum_{x \in M} \delta_{i,t-1}^x r_{i,down}^{chl,x} \leq \sum_{x \in M} q_{i,t}^{chl,x} - \sum_{x \in M} q_{i,t-1}^{chl,x} \leq \sum_{x \in M} \delta_{i,t}^x r_{i,up}^{chl,x}. \qquad (8)$$

for each $i \in N_{ISS}$. The lower bound is based on the working mode in the previous time slot while the upper bound is based on the mode in the present time slot. Thus, the constraint (8) covers all working scenarios, including the case when a chiller starts from or enters into the dormant mode. For feasibility, it is also assumed that $r_{i,up}^{chl,x} \geq q_{i,min}^{chl,x}$. The summation over different working modes for time slot (t−1) is to account for the case that the mode changes at time t.

The on/off status of brine chiller i in time slot i is uniquely indicated by the value 1/0 of $\Sigma_{x \in M} \delta_{i,t}^x$. If the chiller is on (or off), it remains on (or off) for a period of $t_{i,min}^{on}$ (or $t_{i,min}^{off}$). Mathematically, the above logic refers to the following inequalities, $$\sum_{x \in M} \delta_{i,\tau}^x \geq \sum_{x \in M} (\delta_{i,t}^x - \delta_{i,t-1}^x), \forall t \leq \tau - 1 \leq \min\{t + t_{i,min}^{on}, H - 1\}, \qquad (9)$$

$$\sum_{x \in M} \delta_{i,\tau}^x \leq 1 - \sum_{x \in M} (\delta_{i,t-1}^x - \delta_{i,t}^x), \forall t \leq \tau - 1 \leq \min\{t + t_{i,min}^{off}, H - 1\},$$

where the minimisations are applied for consideration of the limited or foreseeable planning horizon.

The electric power consumption of brine chiller i is estimated by a linear (or piece-wise linear) function of the chilling load, $$p_{i,t}^{chl} = \sum_{x \in M} (\alpha_{i,0}^{chl,x} \delta_{i,t}^x + \alpha_{i,t}^{chl,x} q_{i,t}^{chl,x}), \qquad (10)$$

where $\{\alpha_{i,l}^{chl,x}\}_{t=1,2,3}$ are coefficients obtained by fitting the operational data obtained in mode x. Operational data used in the description herefroth may refer to known/past operational data. The indicator $\delta_{i,t}^x$ is multiplied to the zero-order term in order to nullify the term if the chiller is not in that mode. Typically, the coefficients of different modes are non-identical.

As for the associated pumps, in the exemplary embodiment, there are three kinds of associated pumps to support each ISS, namely, a chilled water pump, a chilled brine pump and a cooling (or condenser) water pump. Given an ISS $i \in N_{ISS}$, let its chilled water pump output chilled water at a mass flow rate of $f_{i,t}^{chw}$. The rate is uniquely determined by the chilling demand $q_{i,t}$ allocated to ISS i, via the following equation, $$q_{i,t} = C_{chw} \times \Delta T_{chw} \times f_{i,t}^{chw}, \quad (11)$$

where $\Delta T_{chw}$ is a desired temperature drop and $C_{chw}$ is the specific heat of chilled water at its average temperature.

Let the chilled brine pump be regulated to output chilled brine at a mass flow rate of $f_{i,t}^{chb}$. The flow rate $f_{i,t}^{chb}$ depends on the ISS's working mode, and is expressed in general as $$f_{i,t}^{chb} = \sum_{x \in M} f_{i,t}^{chb,x}, \quad (12)$$

where $f_{i,t}^{chb,x}$ is the mass flow rate when the ISS works in mode x. The flow rates $\{f_{i,t}^{chb,x}\}_{x \in M}$ satisfy the following equations, $$q_{i,t}^{chl,ib} = C_{chb}^{ib} \times \Delta T_{chb}^{ib} \times f_{i,r}^{chb,ib},$$

$$q_{i,t}^{chb,sc} = C_{chb}^{sc} \times \Delta T_{chb}^{sc} \times f_{i,t}^{chb,ib},$$

$$q_{i,t}^{chb,pc} + q_{i,t}^{d} = C_{chb}^{pc} \times \Delta T_{chb}^{pc} \times f_{i,t}^{chb,pc}, \quad (13)$$

where $\{\Delta T_{chb}^{x}\}_{x \in M}$ and $\{C_{chb}^{x}\}_{x \in M}$ are the desired temperature drops and the specific heats of brine at its average temperature in the corresponding working modes, respectively. $f_{i,t}^{chb,pc}$ accounts for the mass flow rate when brine chiller i works in either the parallel cooling mode or the dormant mode (when the ice storage tank can only discharge).

Likewise, let the cooling water be regulated to satisfy the cooling load $(q_{i,t}^{cl})$ at a mass flow rate of $f_{i,t}^{clw}$. The relation between these two variables is given by $$q_{i,t}^{cl} = C_{clw} \times \Delta T_{clw} \times f_{i,t}^{chw}, \quad (14)$$

where $\Delta T_{clw}$ is the desired temperature increment of the cooling water, and $C_{clw}$ is the specific heat of cooling water at its average temperature. The cooling load $(q_{i,t}^{cl})$ is modelled as proportional to the chilling demand, i.e., $$\eta_i^{cl} q_{i,t}^{cl} = \sum_{x \in M} q_{i,t}^{chl,x}, \quad (15)$$

where the coefficient $\eta_i^{cl} \in (0,1)$ is identified from operational data.

In the exemplary embodiment, the electric power consumption of each kind of pump is approximated by a linear (or piece-wise linear) function of the mass flow rate of the working liquid. This leads to a total power consumption estimated as $$p_{i,t}^{pump} = \frac{1}{2} \alpha_{i,0}^{chw} (\delta_{i,t}^{sc} + \delta_{i,t}^{pc} + 1 - \delta_{i,t}^{ib}) + \quad (16)$$

-continued
$$(\alpha_{i,0}^{chb} + \alpha_{i,0}^{clw}) \sum_{x \in M} \delta_{i,t}^{x} + \alpha_{i,1}^{chw} f_{i,t}^{chw} + \alpha_{i,1}^{chb} f_{i,t}^{chb} + \alpha_{i,1}^{clw} f_{i,t}^{clw},$$

where $\{\alpha_{i,1}^{chw}, \alpha_{i,1}^{chb}, \alpha_{i,1}^{chw}\}_{l=0,1,2}$ are coefficients identified from operational data, and the binary $\Sigma_{x \in M} \delta_{i,t}^{x}$ is multiplied to the second zero-order term in order to nullify the power whenever applicable (i.e., when a mode is not active).

The zero-order term $1/2 \alpha_{i,0}^{chw} (\delta_{imt}^{sc} + \alpha_{i,t}^{pc} + 1 - \delta_{i,t}^{ib})$ in equation (16) is equal to $\alpha_{i,0}^{chw}$ if brine chiller i works in series or parallel chilling mode, is equal to zero if the chiller works in ice building mode, and is equal to $1/2 \alpha_{i,0}^{chw}$ if the chiller is in dormant mode. While the first two cases are exact, the last case introduces a bias, in which the correct value is $\alpha_{i,0}^{chw}$ if the ice storage tank discharges and 0 otherwise. The modelled value $1/2 \alpha_{i,0}^{chw}$ may be interpreted as a blind guess or estimate of the zero-order term for the last case. The resulting bias is appreciated to be small since $\alpha_{i,0}^{chw}$ is small compared to an ISS's total operating cost. With this model, it is possible to avoid introducing a new binary variable to indicate whether an ice storage tank discharges or not for each time slot of interest.

Apart from modelling the ice storage tanks, the brine chillers and associated pumps, the chilling demand-supply balance and ISS operating cost are considered.

In the exemplary embodiment, for each time slot to be scheduled, each ISS is to meet either the external chilling demand $(q_{i,t})$ or the internal ice building demand $(q_{i,t}^c)$ (i.e., to meet the chilling demand-supply balance), that is, $$q_{i,t}^c = q_{i,\tau}^{chl,ib}, \quad (17)$$

$$q_{i,t} = \eta_{i,t}^{hex} \left( q_{i,t}^d + \sum_{x \in M \setminus \{ib\}} q_{i,\tau}^{chl,x} \right).$$

where the heat-exchange efficiency coefficient $\eta_i^{hex} \in (0,1)$ is identified from operational data.

In the exemplary embodiment, the total operating cost of ISS i for time slot t may be expressed as $$C_{i,t}^{ISS} = c_t^p T_s (p_{i,t}^{chl} + p_{i,t}^{pump}), \quad (18)$$

where $c_t^p$ is the electricity purchase price as forecasted for time slot t.

Apart from the above modelling, the cooling towers (CTs) are also modelled.

In the exemplary embodiment, let $N_{CT}$ denote the set of CTs available for cooling, e.g. to cool brine chillers. A binary variable $w_{j,t}$ is introduced to indicate the on/off (1/0) status of CT j in time slot t. The aggregate cooling load $\Sigma_{i \in N_{ISS}} q_{i,t}^{cl}$ is shared by active CTs, that is, $$\sum_{i \in N_{ISS}} q_{i,t}^{cl} = \sum_{j \in N_{CT}} q_{j,t}^{CT}, \quad (19)$$

where $q_{j,t}^{CT}$ is the cooling load allocated to CT j which satisfies $$w_{j,t} q_{j,min}^{CT} \leq q_{j,t}^{CT} \leq w_{j,t} q_{j,max}^{CT}, \quad (20)$$

where $q_{j,min}^{CT}$ and $q_{j,max}^{CT}$ correspond to the minimum and maximum cooling load for CT j respectively. In $$p_{j,t}^{CT} = \alpha_{j,0}^{CT} q_{u,t}^{CT} + \alpha_{j,1}^{CT} q_{j,t}^{CT}, \quad (21)$$

$\{\alpha_{j,t}^{CT}\}_{t=0,1,2}$ are coefficients identified from operational data. In the exemplary embodiment, since frequent start-up and shut-down of a CT may not desirable, a small fixed penalty is imposed on such operations. The operating cost of CT j for time slot t is thus expressed as $$C_{j,t}^{CT} = c_t^P T_s p_{j,t}^{CT} + \pi_{j,t}^{CT,su} + \pi_{j,t}^{CT,sd}, \quad (22)$$

where the start-up and shut-down penalty costs $\pi_{j,t}^{CT,su}$ and $\pi_{j,t}^{CT,sd}$ are either zero or positive constants which are determined by the optimisation with the following constraints, $$\pi_{j,t}^{CT,su} \geq c_j^{CT,su}(w_{j,t} - w_{j,t-1})$$

$$\pi_{j,t}^{CT,sd} \geq c_j^{CT,sd}(w_{j,t-1} - w_{j,t}),$$

$$\pi_{j,t}^{CT,su} \geq 0, \pi_{j,t}^{CT,sd} \geq 0, \quad (23)$$

where $c_j^{CT,su}$ and $c_j^{CT,sd}$ correspond to the small penalty costs specified for respective single start-up and single shut-down operations of CT j.

Apart from the above modelling, the ESSs are modelled.

In the exemplary embodiment, a battery model (e.g. for modelling a ESS) may have a form similar to an ice storage tank model. Let $N_{ESS}$ denote the set of ESSs. A binary variable $v_{k,t}^c$ is introduced to indicate whether ESS k is in the charging mode. $p_{k,t}^c$ and $p_{k,t}^d$ are used to denote the charging and discharging rates of ESS k, respectively. The rates satisfy $$0 \leq p_{k,t}^c \leq v_{k,t}^c p_{k,max}^c,$$

$$0 \leq p_{k,t}^d \leq (1 - v_{k,t}^c) p_{k,max}^d, \quad (24)$$

which ensure that charge and discharge do not happen simultaneously. After charge/discharge, the SOC ($s_{k,t}$) of a given ESS $k \in N_{ESS}$ renews into $$s_{k,t} = s_{k,t-1} + T_s(\eta_{k,t}^c p_{k,t}^c - p_{k,t}^d / \eta_{k,t}^d) / E_k^{cap}, \quad (25)$$

which complies with the following limits $$s_{k,min} \leq s_{k,t} \leq s_{k,max}, \quad (26)$$

In equation (26), $s_{k,min}$ and $s_{k,max}$ are the respective minimum and maximum values of SOC to prevent over discharge and over charge of the battery.

In the exemplary embodiment, the operating cost of each ESS comprises electricity cost and storage aging cost, that is, $$C_{k,t}^{ESS} = c_t^P T_s(p_{k,t}^c - p_{k,t}^d) + T_s C_{k,t}^{aging}(p_{k,t}^c, p_{k,t}^d), \quad (27)$$

where $C_{k,t}^{aging}(p_{k,r}^c, p_{k,r}^d)$ evaluates the battery charge and discharge aging cost over a unit time. In the exemplary embodiment, if an ESS uses Li-ion batteries, the charge and discharge aging cost can be approximated by a piece-wise linear function which is obtained from the following quadratic program, $$C_{k,t}^{aging}(p_{k,t}^s, p_{k,t}^d) \approx \frac{c_k^{ESS}}{0.8 E_k^{cap}} \min_{\zeta_{k,t}^{ESS}} \zeta_{k,t}^{ESS}, \quad (28)$$

$$\text{subject to } \beta_k \eta_k^c \left[ 1000 \times a_k^{ESS}(p_{k,t}^c)^2 + n_k b_k^{ESS} p_{k,t}^c \right] \quad (29)$$

$$\text{and } \Delta p_{k,t}^{ESS} = p_{k,t}^c - p_{k,t-1}^c + p_{k,t-1}^d - p_{k,t}^d. \quad (30)$$

$c_k^{ESS}$ is the unit capital cost ($/Wh) to purchase ESS k, $\zeta_{k,t}^{ESS}$ is an auxiliary variable, $\beta_k$ is the fraction of a single cyclic aging cost incurred by fully charging the battery from empty, $n_k \triangleq E_k^{cap}/0.0081$, which is the number of battery modules that form the ESS k, each with a capacity of estimated 0.0081 kW, and $\{a_k^{ESS}, b_k^{ESS}\}_{k \in K_{ESS}}$ are the coefficients associated with the linear segments as indicated by a certain set $K_{ESS}$. The battery's price $c_k^{ESS}$ is divided by 0.8 because it is recognised by the inventors that in practice, a battery is typically replaced if its usable capacity drops to 20% of its original capacity.

In the exemplary embodiment, the parameterised modelling module of the energy storage and scheduling control system provides one or more models (mathematical models) of ISSs, ESSs and CTs (such as those exemplarily described above) that characterise their dynamics and also the associated operational constraints. In the exemplary embodiment, model parameters may be obtained from product specifications or identified from historical operational/experimental data. Such data may be obtained from, but is not limited to, the described data analytic and predictive module. In the exemplary embodiment, the models are integrated to form the skeleton of an optimisation model of the cooling plant system, which may then be inputted into a joint optimisation and scheduling module of the energy storage and scheduling control system (e.g. joint optimisation and scheduling module 204 of FIG. 2B).

In the description below, the data analytic and predictive module is described.

In the exemplary embodiment, the data analytic and predictive module of the energy storage and scheduling control system is configured to compute and provide data to make unknown parameters of the optimisation model (provided by the parameterised modelling module) concrete and adapt to the actual operational data. In the exemplary embodiment, the data analytic and predictive module is configured to collect/obtain data (e.g. measurements or processed data) from the one or more ISSs, the one or more ESSs, the one or more CTs and/or the electricity market authority, and may be further configured to make predictions of relevant data for future time slots within a given/predetermined planning horizon. Data that may be collected from the one or more ISSs may include, for example, working modes of the chillers, previous chilling demands and provided chilling powers, and associated energy consumptions. Data that may be collected from the one or more ESSs may include, for example, realised charge/discharge rates, states of charge, and associated limits. Data that may be collected from the one or more CTs may include, for example, cooling capacities and associated energy consumptions. Data that may be collected from the power market authority may include, for example, demand charge rates, hourly/half-hourly electricity market purchase and sale prices, and regulation market and reserve market clearing prices. The collected data (such as those described above) may be used to produce data forecasts for future time slots within the given/predetermined planning time horizon. These forecasts may be inputted into a scheduling optimiser component of the joint optimisation and scheduling module (e.g. scheduling optimiser component 220 of FIG. 2B), to make the optimisation model concrete and ready for performing optimisation.

In the description below, optimisation and/or the joint optimisation and scheduling module is described.

In the exemplary embodiment, the models of ISSs, ESSs and CTs developed in the parameterised modelling module are integrated into a system-level model (or the optimisation model) by incorporating also the interactions and couplings in between those components. The interactions and couplings may be captured by a chilling demand-supply balance, a cooling demand-supply balance, and an electric demand-supply balance. The obtained integral model (or the optimisation model) can define the joint scheduling optimisation to be performed, which may then be solved. If computational time is an issue, optimisation may be simplified in some exemplary embodiments and approximated based on analytical insights such that a solution can be obtained within an amount of time that is acceptable to specific applications. Typical analytical insights may be to identify the weak couplings between the physical components, e.g., ISSs and ESSs, and to decompose the optimisation into simpler ones which may admit more efficient and online solutions. In the exemplary embodiment, optimisation may be realised in a computer module/system configured to communicate with the ISSs and ESSs of the cooling plant system. As an example, see FIG. 8. As an example, an energy storage and scheduling control system may be coupled to components of a cooling plant system e.g. ISSs and/or ESSs by, wired or wireless connections or a combination of both types of connections.

In the exemplary embodiment, the joint optimisation and scheduling module is configured to receive one or more inputs such as the cooling plant system model (or optimisation model or component models, from the parameterised modelling module) and real-time measured/forecasted data (from the data analytic and predictive module), and is further configured to conduct optimisation of the schedules of the one or more ISSs, the one or more ESSs and the one or more CTs. In the exemplary embodiment, the schedules may cover multiple future time slots and the schedule of the first time slot is implemented. The joint optimisation and scheduling module is configured to make decisions on, for each time slot under planning, for example, the working mode of each ISS and the corresponding chilling capacity to be activated, the working mode of each ESS and the corresponding charge/discharge rate, and the working mode of each CT and the corresponding cooling capacity to be activated. The optimised schedules for the first time slot may be sent out or transmitted by the joint optimisation and scheduling module to the management systems of the corresponding units, which may then be executed in the respective unit (e.g. ISS or ESS etc.).

The inventors have recognised that the energy storage and scheduling control system described in the exemplary embodiment may be used for the cooling plant system to participate in ancillary services. In the exemplary embodiment, the cooling plant system may participate in at least two kinds of ancillary services to the power grid, namely, frequency regulation and contingency reserve. For example, ESSs of the cooling plant system may be used to shift the electric load of the system in order to reduce the energy cost and to provide frequency regulation service to the grid. ESSs may also be used to assist the ISSs for participation in contingency reserve service. In the exemplary embodiment, the ESSs' relatively fast response may be used to complement the relatively slow response of ISSs in order to satisfy the tight response time requirement in case of a contingency and the long-lasting capability of ISSs may be utilised to meet the minimum support time requirement of contingency service. For example, in a contingency (e.g. increased cooling demand), the ESSs may assist the power grid in provision of electrical energy to the ISS.

The two grid services are described in sequence below.

In the exemplary embodiment, the cooling plant system may participate in the regulation market by charging/discharging ESSs appropriately. Let $u_t^{fr,up}$ be the regulation indicator which is 1 if it is to ramp up and 0 otherwise. The minimum power to participate in the regulation market is denoted to be $P_{min}^{fr}$. Let the binary variable $v_t^{fr}$ indicate whether the cooling plant system decides to participate or not (i.e., $v_t^{fr}$ equals to 1 or 0, correspondingly) in time slot t, and let $p_t^{fr}$ denote the power capacity committed by ESS k for the time slot. The commission to frequency regulation, and the charge and discharge of ESSs satisfy the following constraints, $$p_t^{fr} \triangleq \sum_{k \in N_{ESS}} (1 - u_t^{fr,up}) p_{k,t}^c + u_t^{fr,up} p_{k,t}^d \geq v_t^{fr} p_{min}^{fr}. \qquad (31)$$

Further, the commission to frequency regulation satisfy the following constraints, $$0 \leq p_{k,t}^{fr} \leq v_t^{fr} \times \{p_{k,max}^c, p_{k,max}^d\}, \qquad (32)$$

$$p_t^{fr} \triangleq \sum_{k \in N_{ESS}} p_{k,t}^{fr} \geq v_t^{fr} p_{min}^{fr},$$

$$p_{k,t}^c \leq (1 - v_t^{fr}) p_{k,max}^c,$$

$$p_{k,t}^d \leq (1 - v_t^{fr}) p_{k,max}^d,$$

of which the last two constraints mean that no unidirectional charge or discharge is scheduled if the ESS is committed to frequency regulation in time slot t. The ESSs switch between charging and discharging modes within a commission period.

In the exemplary embodiment, let $\Delta_t^{fr,up}$ (or $\Delta_t^{fr,dn}$) be the forecasted fraction of the ramp up (or down) reserve capacity that is actually deployed within time slot t. In the actual operation of an ESS, $\Delta_t^{fr,up}$ and $\lambda_t^{fr,dn}$ vary over each time slot and are obtained based on the historical regulation command signals. With scheduled charge/discharge or participation in frequency regulation, the SOC ($s_{k,t}$) of an ESS may be updated such that the following equation, $$s_{k,t} = s_{k,t-1} + \frac{T_k}{E_k^{cap}} \left\{ \eta_{k,t}^c (p_{k,t}^c + \lambda_t^{fr,da} p_{k,t}^{fr}) - \frac{1}{\eta_{k,t}^d} (p_{k,t}^d + \lambda_t^{da} p_{k,t}^{fr}) \right\}, \qquad (33)$$

is satisfied for each $k \in N_{ESS}$. The SOC complies with the following limits $$s_{k,min} \leq s_{k,t} \leq s_{k,max}, \qquad (34)$$

Here, $s_{k,min}$ and $s_{k,max}$ are the respective minimum and maximum values of SOC to prevent over discharge and over charge of the battery.

In addition, payment to regulation service in different regions may follow different schemes. In this exemplary embodiment, the payment scheme implemented by PJM (PJM Interconnection LLC) in the USA is modelled. Participation in frequency regulation is paid with consideration of the participating power capacity (denoted by $p_t^{fr}$) and the regulation performance (dictated by performance score $\rho_t^{fr}$ and regulation mileage ratio $\mu_t^{fr}$). The performance score ($\rho_t^{fr}$) is computed based on the historical regulation performance (for example, over a period of 100 hours), and the mileage ratio ($\mu_t^{fr}$) is the mileage of the fast regulation signal divided by the mileage of the slow (or conventional) regulation signal. The mileage ratio can be computed and updated periodically, for example, with a period specified by $T_s$. The Regulation Market Capacity Clearing Price (RMCCP), denoted by $c_t^{RMCCP}$, and the Regulation Market Performance Clearing Price (RMPCP), denoted by $c_t^{RMPCP}$, are updated at a period of $T_s$. With the PJM payment scheme, the revenue from the regulation service may be computed as $$R_t^{fr}=T_s\rho_t^{fr}p_t^{fr}(c_t^{RMCCP}+c_t^{RMCCP}\mu_t^{fr}). \tag{35}$$

With regard to contingency reserve, in the exemplary embodiment, the cooling plant system may alternatively or additionally participate in the contingency reserve market. In the exemplary embodiment, a contingency reserve market which periodically publishes a reserve availability price, denoted by $c_t^{CT}$ for time slot t, is considered. The market may desire a maximum response time of $t_{tsp}^{cr}$ ($\leq T_s$), a minimum participation power of $p_{min}^{ct}$ and a minimum support time $T_{min}^{cr}$. The cooling plant system may choose to participate or not in this service which, in the exemplary embodiment, is denoted by a binary variable $v_t^{cr}$, which will be equal to 1 if the system participates and equal to 0 otherwise. If participating, the ESSs may assist during the transient when the ISSs are not able to ramp up to the committed reserve capacity to meet the response time requirement (e.g. 10 minutes for the market in Singapore). Let the power that may be reduced by brine chiller i be denoted as $p_{i,t}^{cr,chl}$, and the power reserved by ESS k be denoted by $p_{k,t}^{cr,d}$ for the period t. These power reserves satisfy the following constraints, $$0 \leq p_{i,t}^{cr,cbl} \leq v_t^{cr} p_{i,max}^{chl}, \forall\, i \in N_{tss}, \tag{36}$$

$$0 \leq p_{k,t}^{cr} \leq v_t^{cr} p_{k,max}^{d}, 0 \leq p_{k,t}^{cr,c} \leq v_t^{cr} p_{k,max}^{c}, \forall\, k \in N_{ESS},$$

$$p_t^{cr} := \sum_{i \in N_{ISS}} p_{i,t}^{cr,chl} \geq v_t^{cr} p_{min}^{cr},$$

$$\sum_{k \in N_{ESS}} p_{k,t}^{cr,d} + p_{k,t}^{cr,c} \geq \frac{t_{tsp,e}^{cr}}{t_{tsp}^{cr} + t_{rsp,e}^{cr}} \sum_{i \in N_{ISS}} p_{i,t}^{crmchl}.$$

This may also be $$0 \leq p_{i,j}^{cr,chl} \leq v_t^{cr} p_{i,max}^{chl}, \forall\, i \in N_{ISS}, \tag{36a}$$

$$0 \leq p_{k,i}^{cr,d} \leq v_t^{cr} p_{k,max}^{d}, 0 \leq p_{k,i}^{cr,c} \leq v_t^{cr} p_{k,max}^{c}, \forall\, k \in N_{ESS},$$

$$p_i^{cr} := \sum_{i \in N_{ISS}} p_{i,j}^{cr,chl} \geq v_t^{cr} p_{min}^{cr},$$

$$\sum_{k \in N_{ESS}} p_{k,t}^{cr,c} + p_{k,t}^{cr,d} \geq \frac{t_{rsp,e}^{cr} p_t^{cr}}{t_{rsp}^{cr} + y_{rsp,e}^{cr}}$$

where $t_{rsp,e}^{cr}$ denotes the extended response time for the ISSs to respond to a contingency. During the extended response period, the capacity (or power) provided by ISSs increases linearly with time and the ESSs are used to fill the gap to the committed reserve capacity.

In the exemplary embodiment, associated with the drop of power supply to the brine chiller is the decrease of the chilling load assigned to the chiller, which may meanwhile indicate an increase in the chilling load assigned to the ice storage tank. These are reflected in following equations, $$p_{i,t}^{chl} - p_{i,t}^{cr,chl} = \sum_{x \in M} [\alpha_{i,0}^{chl,x}\delta_{i,t}^{x} + \alpha_{i,1}^{chl,x}(q_{i,t}^{chl,x} - q_{i,t}^{cr,chl,x})], \tag{37}$$

$$q_{i,t}^{cr,x} = q_{i,t}^{cr,chl,ib},$$

$$q_{i,t}^{cr,d} = \sum_{x \in M\setminus\{ib\}} q_{i,t}^{cr,chl,x}.$$

Also, $$p_{i,t}^{cr,chl} = \sum_{x \in M} \alpha_{i,1}^{chl,x} q_{i,t}^{cr,chl,x}, \tag{37a}$$

$$q_{i,t}^{cr,x} = q_{i,t}^{cr,chl,ib},$$

$$q_{i,t}^{cr,d} = \sum_{x \in M\setminus\{ib\}} q_{i,t}^{cr,chl,x}.$$

in which it is assumed that the brine chillers do not change working modes while providing the contingency reserve service.

In the exemplary embodiment, the charge and discharge rates and the SOC of ESS k conservatively satisfy the following constraints, $$p_{k,r}^{d} \leq p_{k,max}^{d} - p_{k,t}^{cr,d}, \tag{38}$$

or alternatively equation (38a)

$$p_{k,t}^{d} \leq (1-v_{k,t}^{s})p_{k,max}^{d} - p_{k,t}^{cr,d}, \tag{38a}$$

$$p_{k,t}^{c} \geq p_{k,t}^{cr,c}, \tag{39}$$

$$s_{k,t} \geq s_{k,min} + \frac{p_{k,t}^{cr,d} t_{rsp,c}^{cr}}{\eta_{k,t}^{d} E_k^{cap}} \tag{40}$$

or alternatively equation (40a)

$$s_{k,t} \geq s_{k,max} + \frac{t_{rsp,c}^{cr}}{2E_k^{cap}} \sum_{r=t-H-3}^{r} \frac{p_{k,t}^{cr,d}}{\eta_{k,t}^{d}} + \eta_{k,t}^{d} p_{k,t}^{cr,c}, \tag{40a}$$

of which, the first two (e.g. equations ((38) and (39)) owe to the reserved power and the third (e.g. equation (40)) enforces the desire for minimum support time. The charge/discharge rate and the SOC of ice storage tank i satisfies the following constraints:

$$0 \leq q_{i,t}^{cr,c} \leq \min\{\delta_{i,t}^{ib}, v_t^{cr}\} q_{i,max}^{c}, \tag{41}$$

$$0 \leq q_{i,t}^{cr,d} \leq \min\{1-\delta_{i,t}^{ib}, v_t^{cr}\} q_{i,max}^{d}, \tag{42}$$

$$q_{i,t}^{c} \geq \delta_{i,t}^{ib} q_{i,min}^{cr,c}, \tag{43}$$

or alternatively equation (43a)

$$q_{i,t}^{c} \geq \delta_{i,t}^{ib} q_{i,min}^{c} + \sum_{r=t-H-3}^{r} q_{i,t}^{cr,c}, \tag{43a}$$

$$q_{i,t}^{d} \leq (1-\delta_{i,t}^{ib}) q_{1,max}^{d} - q_{i,t}^{cr,d}, \tag{44}$$

or alternatively equation (44a)

$$q_{i,t}^{d} + \sum_{r=t-H-3}^{r} q_{i,t}^{cr,d} \leq (1-\delta_{i,t}^{ib}) q_{1,max}^{d}, \tag{44a}$$

$$-r_{i,down}^{c} \leq q_{i,t}^{c} - \frac{T_s}{t_{rsp}^{cr} + t_{rsp,e}^{cr}} q_{i,t}^{cr,c} - q_{i,t-1}^{c} \leq r_{i,up}^{c}, \tag{45}$$

or alternatively equations (45a) and (45b)

$$q_{i,t}^c - \frac{T_s}{t_{rsp}^{cr} + t_{rsp,e}^{cr}} q_{i,t}^{cr,e} - q_{i,t-1}^c \geq -r_{i,down}^c, \quad (45a)$$

$$q_{i,t}^c + \frac{T_s}{t_{rsp}^{cr} + t_{rsp,e}^{cr}} q_{i,t-1}^{cr,e} - q_{i,t-1}^c \leq r_{i,up}^c, \quad (45b)$$

$$-r_{i,down}^d \leq q_{i,t}^d + \frac{T_s}{t_{rsp}^{cr} + t_{rsp,e}^{cr}} q_{i,t}^{cr,d} - q_{i,t-1}^d \leq r_{i,up}^d, \quad (46)$$

or alternatively equations (46a) and (46b)

$$q_{i,x}^d - \frac{T_s}{t_{rsp}^{cr} + t_{rsp,e}^{cr}} q_{i,t-1}^{cr,d} - q_{i,x-1}^d - r_{i,down}^d, \quad (46a)$$

$$q_{i,t}^d + \frac{T_s}{t_{rsp}^{cr} + t_{rsp,e}^{cr}} q_{i,t}^{cr,d} - q_{i,t-1}^d \leq r_{i,up}^d, \quad (46b)$$

$$\varepsilon_{i,j} \geq \varepsilon_{i,min} + \frac{q_{i,1}^{cr,d} T_{min}^{cr}}{\gamma_i^d Q_i^{cap}} \quad (47)$$

or alternatively equation (47a)

$$\varepsilon_{i,t} \geq \varepsilon_{i,min} + \frac{T_{min}^{cr} - 0.5(t_{rsp}^{cr} + t_{rsp,e}^{cr})}{Q_i^{cap}} \sum_{r=t-H-3}^{r} \frac{q_{i,t}^{cr,d}}{\gamma_i^d} + \gamma_i^e q_{i,t}^{cr,e}. \quad (47a)$$

In addition, the brine chiller complies with its ramp up/down rate constraints, $$-\sum_{x \in M} \delta_{i,t}^x r_{i,down}^{chl,x} \leq -q_{i,t}^{cr,chl} + \sum_{x \in M} q_{i,t}^{chl,x} - \sum_{x \in M} q_{i,t-1}^{chl,x} \leq \sum_{x \in M} \delta_{i,t}^x r_{i,up}^{chl,x}, \quad (48)$$

or alternatively equations (48a) to (48c)

$$q_{i,t}^{chl,x} - q_{i,t-1}^{chl,x} \geq \delta_{i,t}^x q_{i,min}^{chl,x}, \forall x \in M, \quad (48a)$$

$$q_{i,t}^{chl,x} - \frac{T_s}{t_{rsp}^{cr} + t_{rsp,e}^{cr}} q_{i,t}^{cr,x} - \sum_{x \in M} q_{i,t-1}^{chl,x} \geq -\sum_{x \in M} \delta_{i,t-1}^x r_{i,down}^{chl,x}, \quad (48b)$$

$$q_{i,t}^{chl,x} + \frac{T_s}{t_{rsp}^{cr} + t_{rsp,e}^{cr}} q_{i,t}^{cr,x} - \sum_{x \in M} q_{i,t-1}^{chl,x} \leq \sum_{x \in M} \delta_{i,t}^x r_{i,up}^{chl,x}. \quad (48c)$$

In the exemplary embodiment, the revenue from this contingency reserve service is obtained as $$R_t^{cr} = c_t^{cr} T_s p_t^{cr}. \quad (49)$$

It is recognised that equation (49) does not take account of the revenue and cost resulting from discharging the ESSs under contingencies.

In the exemplary embodiment, for joint scheduling and optimisation of the cooling plant system described, the one or more ISSs, the one or more CTs and/or the one or more ESSs are scheduled in such a way that the total net profit (TNP) over a given time horizon is maximized (or equivalently, the total net loss/cost is minimised). For the time horizon indicated by $\mathcal{H}_t$, the TNP is derived as follows, $$TNP(t) = \sum_{\tau \in H_t}\left(R_\tau^{ss} + R_\tau^{cs} - \sum_{i \in N_{ISS}} C_{i,\tau}^{ESS} - \sum_{j \in N_{CT}} C_{j,\tau}^{CT} - \sum_{k \in N_{ESS}} C_{k,\tau}^{ESS}\right) \quad (50)$$

$$= T_s \sum_{\tau \in H_t} \begin{pmatrix} c_t^{cr} p_t^{cr} + v_t^{fr} p_t^{fr} \rho_t^{fr} (c_t^{RMCCP} + c_t^{RMPCP} \mu_t^{fr}) \\ -c_t^p \left(\sum_{i \in N_{ISS}}(p_{i,t}^{chl} + p_{i,t}^{pump}) + \sum_{j \in N_{CT}} p_{j,t}^{CT}\right) \\ -\sum_{k \in N_{ESS}} \left(c_t^p (p_{k,s}^c - p_{k,r}^d) + \frac{c_k^{ESS}}{0.8 E_k^{cap}} \min_{\zeta_{k,t}^{ESS}} \zeta_{k,t}^{ESS}\right) \end{pmatrix},$$

where the minimisation of $\zeta_{k,t}^{ESS}$ is subject to the constraints in equation (33). After simplification, the optimisation is equivalent to the following form, $$P0:\min \sum_{\tau \in H_t} \begin{pmatrix} c_t^p p_t + \sum_{k \in N_{ESS}} \frac{c_k^{ESS} \zeta_{k,t}^{ESS}}{0.8 E_k^{cap}} \\ -c_t^{cr} P_t^{cr} - v_t^{fr} p_t^{fr} \rho_t^{fr} (c_t^{RMCCP} + c_t^{RMPCP} \mu_t^{fr}) \end{pmatrix} \quad (51)$$

s.t., (1) – (48c), $\forall x \in M$, $i \in N_{ISS}$, $k \in N_{ESS}$, $\tau \in \mathcal{H}_t$, where $$p_\tau \triangleq \sum_{i \in N_{ISS}}(p_{i,t}^{chl} + p_{i,t}^{pump}) + \sum_{j \in N_{CT}} p_{j,t}^{CT} + \sum_{k \in N_{ESS}} (p_{k,s}^c - p_{k,r}^d). \quad (52)$$

The decision variables of problem P0 may be classified by their relation to the different sectors of the cooling plant system as follows, variables associated with ISSs: $\{\delta_{i,t}^x, q_{i,t}^{chl,x}\}_{i \in N}$, $\{q_{i,t}^c, q_{i,t}^d, q_{i,t}^{cr}, q_{i,t}^{cr1}, p_{i,t}^{cr,x}\}_{i \in N}$ and $\{v_\tau^{cr}\}$ for all $\tau \in \mathcal{H}_t$ variables associated with CTs: $\{w_{j,t}, q_{j,t}^{CT}\}_{i \in N_{CT}}$ for all $\tau \in \mathcal{H}_t$ variables associated with ESSs: $\{v_{k,t}^c, p_{k,t}^c, p_{k,t}^d, p_{k,t}^{cr}, p_{k,t}^{cr,d}\}_{k \in N_{ESS}}$ and $\{v_\tau^{cr}\}$ for all $\tau \in \mathcal{H}_t$ auxiliary variables used in expressing the aging costs of ESSs $\{\zeta_{k,t}^{ESS}\}_{k \in N_{ESS}}$ for all $\tau \in \mathcal{H}_t$, and in expressing the start-up and shut-down costs of CTs $\{\pi_{j,t}^{CT,su}, \pi_{j,t}^{CT,sd}\}_{j \in N_{CT}}$ for all $\tau \in \mathcal{H}_t$.

It is recognised that other symbols may be either intermediate variables or problem data. Overall, the problem P0 is a mixed integer program with a linear objective function, a couple of quadratic constraints (due to equation (33)) and a series of linear constraints. It may be solved within a reasonable amount of time by, e.g. existing mixed-integer quadratic program (MIQP) solvers if the size of the problem is limited, i.e., if the optimisation horizon H and the total number of ISSs, CTs and ESSs, which determine the total number of binary variables, are comparatively small.

In the exemplary embodiment, upon obtaining an optimal solution for P0, the solution for time slot t is implemented. The solution for time slot t+1 is obtained in a similar way by shifting the time horizon one slot ahead and then solving for the new optimisation. The process may repeat, and hence, the scheduling solution is a result of a so-called rolling-horizon optimisation in the area of operations research or a so-called model predictive control in the area of control theory.

Figure 4:
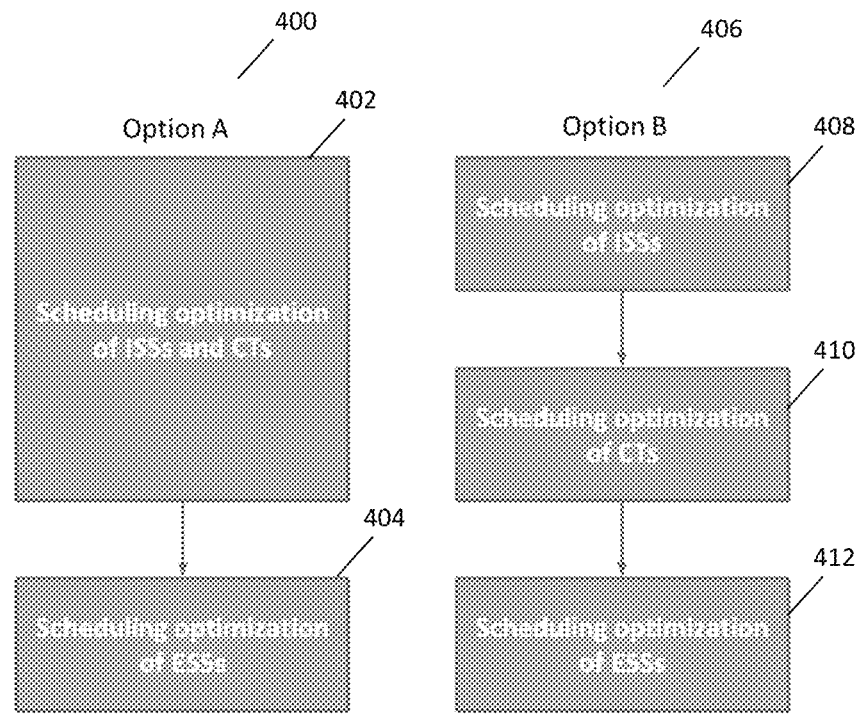
FIG. 4 is a schematic diagram showing two exemplary low complexity/computations suboptimal flows for use at a joint optimisation and scheduling module in an exemplary embodiment.

FIG. 4 is a schematic diagram showing two exemplary low complexity/computations suboptimal flows for use at a joint optimisation and scheduling module in an exemplary embodiment.

In a general case, time taken to arrive at a solution (e.g. for equation (51)) is expected to increase exponentially with an increase in the numbers of ISSs, ESSs and CTs in a cooling plant system. Therefore, an approximate solution may be explored when the time taken to arrive at the solution exceeds a time limit that is acceptable for an application. In that case, a viable approximation may be developed by decomposing the original optimisation process into smaller/simpler ones and then tackling them in a certain sequence to form a final solution e.g. the optimisation may be performed in a stepwise manner (rather than all terms being optimised simultaneously). In developing a viable approximation, relations between the one or more ISSs, the one or more CTs and/or the one or more ESSs may be taken into account. The relations may include, for example, how the one or more ESSs support the one or more ISSs and/or the one or more CTs with electric power, and how the operating modes of the one or ESSs may be uniquely determined once those of the one or more ISSs and/or the one or more CTs are given, how the one or more ISSs dominate the energy cost of the whole cooling plant system, and how their optimal operating modes may be weakly dependent on those of the one or more CTs and/or the one or more ESSs, and how the operating modes of the one or more CTs may be uniquely determined once the operating modes of one or more ISSs are given.

By considering the relations between the one or more ISSs, the one or more CTs and/or the one or more ESSs, it may lead to two feasible approximations of the original optimisation process, namely, Option A 400 and Option B 406 as shown in FIG. 4. In the exemplary embodiment, it may be possible to verify that changing the sequence of optimisations may cause infeasibility.

In the exemplary embodiment, Option A 400 tackles the scheduling of the one or more ISSs and the one or more CTs simultaneously at step 402, followed by the scheduling of the one or more ESSs at step 404, which may result in reducing the binaries in the first stage by the number of the ESSs and in the second stage by the number of ISSs and CTs. In the exemplary embodiment, Option B 406 tackles the scheduling of the one or more ISSs at step 408, the scheduling of the one or more CTs at step 410 and the scheduling of the one or more ESSs at step 412 in sequence, which may result in achieving an even further reduction of binary decision variables in the first stage.

In both options, the commission to contingency reserve service is tentatively scheduled in the first stage and finalised in the last stage of optimisation, and the last stages are subject to the feasibility of reserving the capacities together with the schedules of the one or more ISSs and/or the one or more CTs optimised in the previous stage(s). Both options may result in sacrificing maximum optimality, but may incur minimum impacts when compared to an existing cooling plant system where ESSs are absent. In the exemplary embodiment, with the sub-optimal solutions (e.g. Option A 400 and Option B 406), the cooling plant system may include the one or more ESSs in a plug-and-play manner which may demand minimum modifications to existing scheduling systems. That is, given that the scheduling of the one or more ESSs (at steps 404 and 412) are separate from e.g. steps 402, 410, the one or more ESSs may be used in a plug-and-play manner.

In the exemplary embodiment, the total computational time of Option B 406 may be less than Option A 400 due to the further decomposition incurred under Option B 406. It is recognised that the further decomposition may be at a cost of optimality. The cost may be large or small, depending on the specific cooling plant system. The cost may be estimated via offline simulations before an approximate solution method (for example, Option A 400 and Option B 406) is selected for implementation.

The joint scheduling of the one or more ISSs, the one or more CTs and the one or more ESSs in the exemplary embodiment may be useful to a problem to be considered and may serve particular interests of an application.

Simulations results of three scenarios obtained via joint optimisation and scheduling of ISSs, CTs and ESSs are shown in FIGS. 5A-5E, 6A-6G and 7A-7D. In each simulation, a cooling plant system participated in frequency regulation and contingency reserve markets, with minimum participation power and/or energy, and response time requirements. In the first scenario ("scenario (a)"), the cooling plant system comprised 3 ISSs, 8 CTs but no ESS. Scenario (a) was performed for benchmarking purposes. In the second scenario ("scenario (b)") there were 2 ISSs, 6 CTs and 1 ESS. Scenario (b) was performed for validation purposes. In the third scenario ("scenario (c)"), there were 3 ISSs 4 CTs and 1 ESS. In the simulations, the ISSs and ESSs were able to participate in frequency regulation and spinning/contingency reserve markets, with minimum participation power and/or energy requirements, and the payment schemes were based on those of a major regional transmission organisation that coordinates the movement of wholesale electricity in parts of the USA. The electricity price was based on the electricity wholesale market price in Singapore.

FIGS. 5A, 5B, 5C, 5D and 5E are graphs showing simulation results (half-year joint optimisation and scheduling results) of scenario (a) in an exemplary embodiment. In the simulation, the schedule was updated every half hour with a rolling horizon of 6 hours. The simulation was driven with real/actual operational data from a cooling service provider.

Figure 5:
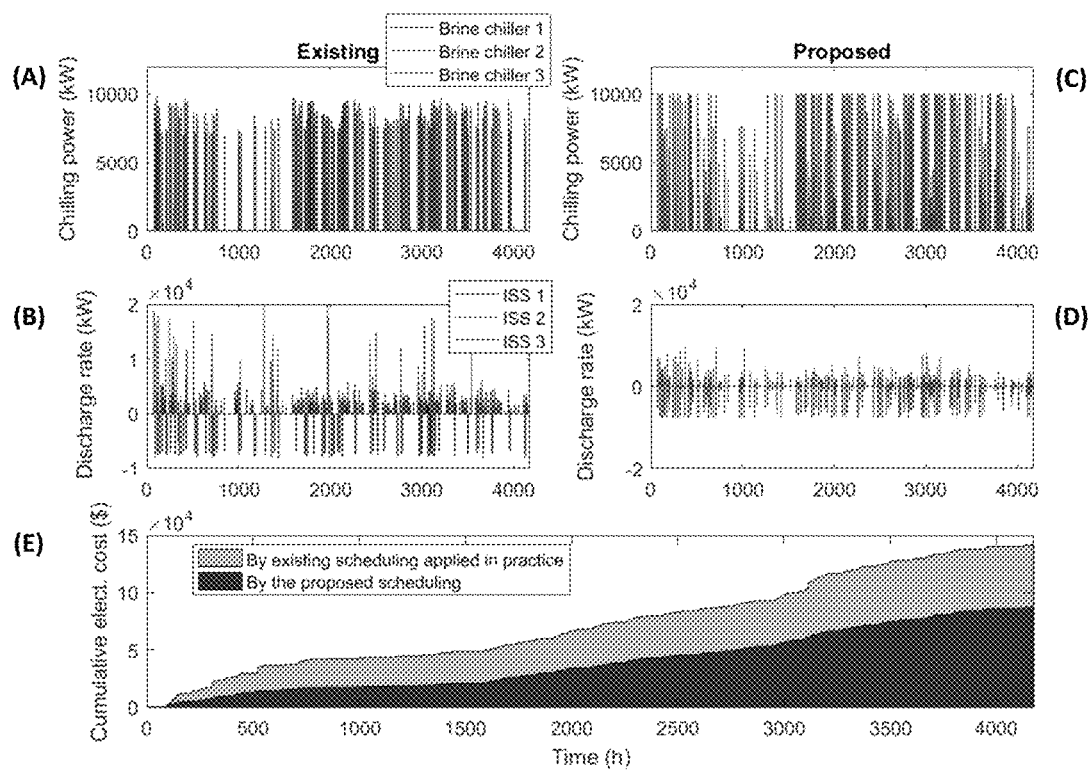
FIGS. 5A, 5B, 5C, 5D and 5E are graphs showing simulation results (half-year joint optimisation and scheduling results) of scenario (a) in an exemplary embodiment.

FIG. 5A shows the chilling power (in kW) over time (in hours) in three different brine chillers using existing scheduling applied in practice. FIG. 5B shows the discharge rate (in kW) over time (in hours) in three different ISSs using existing scheduling applied in practice. FIG. 5C shows the chilling power (in kW) over time (in hours) in three different brine chillers using the proposed scheduling (e.g. of the exemplary embodiments described). FIG. 5D shows the discharge rate (in kW) over time (in hours) in three different ISSs using the proposed scheduling (e.g. of the exemplary embodiments described). FIG. 5E shows the cumulative cost (in $) over time (in hours) using existing scheduling applied in practice (lighter portion) and by the proposed scheduling (darker portion) respectively.

The results of scenario (a) indicate that the proposed joint optimisation and scheduling (e.g. of the exemplary embodiments described) was able to significantly reduce the total electric cost of operating the cooling plant system, and the savings are nearly 38% of the electric cost (or about S$50,000) which resulted from an existing scheduler for the same half-year period. Since the simulation was driven with real/actual operational data from a cooling company, the simulation results justify the notable value of the developed technology to be brought to the relevant cooling industry.

FIGS. 6A to 6G are graphs showing simulation results (four-week joint optimisation and scheduling results) of scenario (b) in an exemplary embodiment. In the simulation, the schedule was updated every half hour with a rolling horizon of 3.5 hours. Further, in this simulation, "SOC" refers to the percentage of the currently usable energy relative to the available energy capacity of an ISS/ESS.

Figure 6:
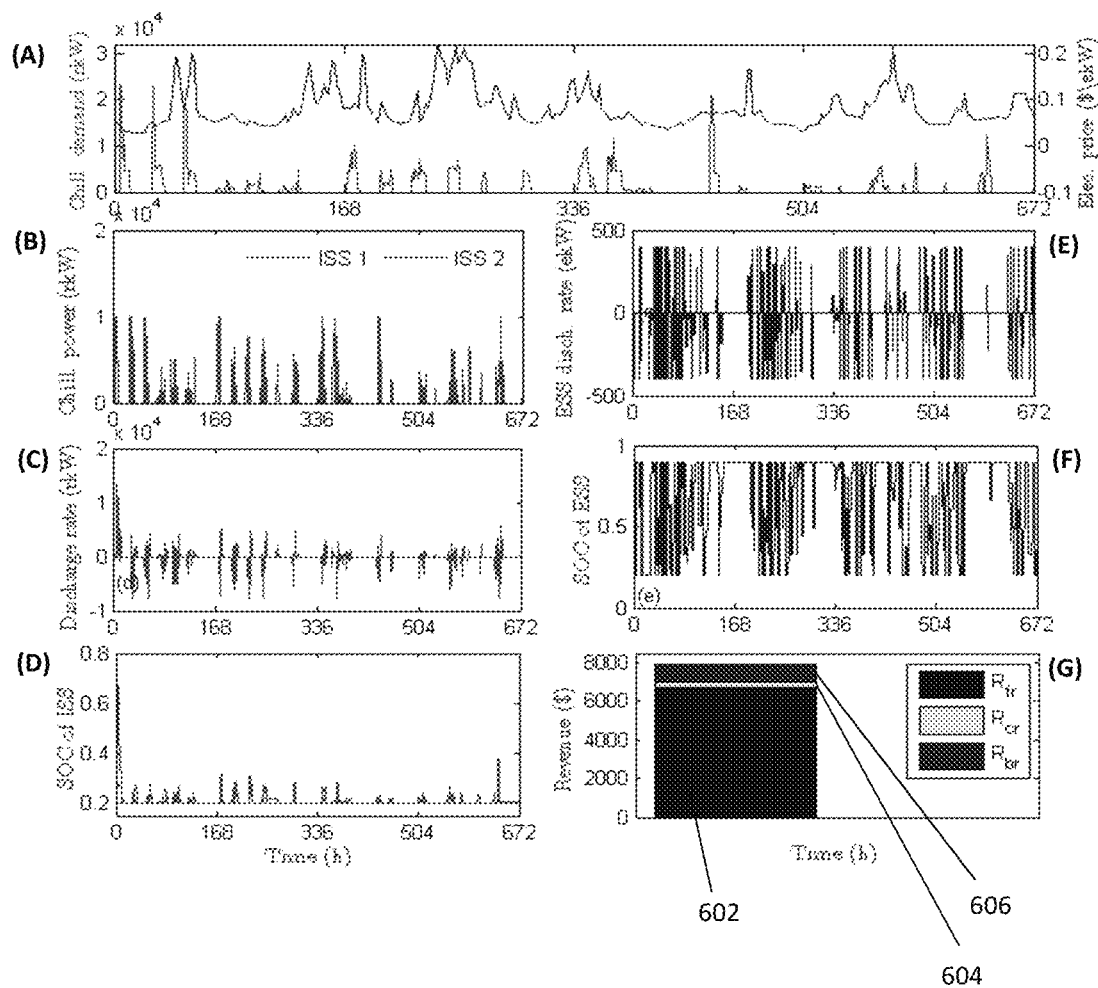
FIGS. 6A, 6B, 6C, 6D, 6E, 6F and 6G are graphs showing simulation results (four-week joint optimisation and scheduling results) of scenario (b) in an exemplary embodiment.

FIG. 6A shows the chilling demand (in kW; bottom plots) and the electricity price (in $/ekW; top plots) over time (in hours). FIGS. 6B to 6D show the chilling power (in rkW), the discharge rate (in rkW) and the SOC of the ISS over time (in hours) for each ISS respectively. FIGS. 6E and 6F show the ESS discharge rate (in ekW) and the SOC of the ESS over time (in hours) respectively. FIG. 6G shows the revenues generated from regulation services ($R_{fr}$) 602, contingency reserve services ($R_{cr}$) 604, and time-of-use (TOU) electric bill reduction ($R_{br}$) 606.

The results of scenario (b) show the results when every unit worked under an optimised schedule (e.g. of the exemplary embodiments described). The results of scenario (b) also show that the ISSs and ESSs were charged and discharged appropriately to minimise the net cost of operating the cooling plant system. To that end, the system was optimised to participate in the frequency regulation and contingency reserve markets only in appropriate periods. The positive revenues from the two services together with resulting time-of-use electric bill reduction are shown in FIG. 6G. The results demonstrate the efficacy of the developed scheduling scheme (e.g. of the exemplary embodiments described).

FIGS. 7A to 7D are graphs showing simulation results (one-week joint optimisation and scheduling results) of scenario (c) in an exemplary embodiment. In the simulation, the schedule was updated hourly with a rolling horizon of 4 hours. Further, in this simulation, "SOC" refers to the percentage of the currently usable energy relative to the available energy capacity of an ISS/ESS.

Figure 7:
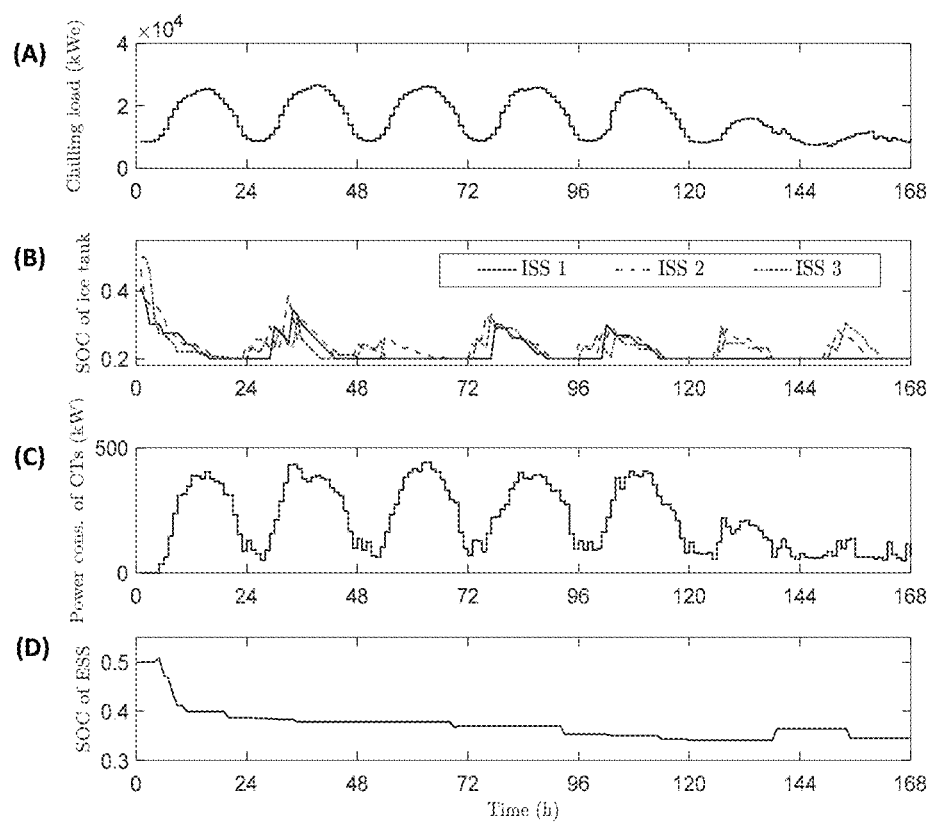
FIGS. 7A, 7B, 7C and 7D are graphs showing simulation results (one-week joint optimisation and scheduling results) of scenario (c) in an exemplary embodiment.

FIG. 7A shows the chilling load (in kWe) over time (in hours). FIG. 7B shows the SOC of an ice storage tank over time (in hours). FIG. 7C shows the power consumption of the CTs over time (in hours). FIG. 7D shows the SOC of the ESS over time (in hours).

The results of scenario (c) show that the ISSs and the ESSs were charged and discharged appropriately to minimise the electric cost of the cooling system while meeting the chilling demand, which demonstrate the effectiveness of the developed scheduling scheme (e.g. of the exemplary embodiments described).

In addition to the above simulations, simulations to demonstrate the potential usefulness of the proposed low complexity computational options, e.g. Options A and B (described with reference to FIG. 4), which may assist to obtain good approximate solutions with reduced computational times, were also conducted. In a first simulation (a 3-week operation), a scenario similar to scenario (b) described with reference to FIGS. 6A to 6G was used except that the 1 ESS had a capacity of 400 kWh. In a second simulation (a 4-week operation), scenario (b) was used. The computational times to solve the scheduling problems under the first and second simulations are summarised in Tables 1 and 2 below respectively. As can be seen from Tables 1 and 2, both low computational options considerably reduce the computational time. In the simulations, the sacrifices to optimality were negligible for both suboptimal schemes (i.e., Options A and B) relative to the proposed exact method (of joint optimisation and scheduling), i.e. since the operating cost differences were relatively small.

TABLE 1

Computational performance of the low complexity computational methods under the first simulation.

|  | Proposed Exact Method | Suboptimal Option A | Suboptimal Option B |
| --- | --- | --- | --- |
| Average solution time (sec) | 52.33 | 7.77 | 3.95 |
| Total operating cost (SG $) | 6022 | 6044 | 6037 |

TABLE 2

Computational performance of the low complexity computational methods under the second simulation.

|  | Proposed Exact Method | Suboptimal Option A | Suboptimal Option B |
| --- | --- | --- | --- |
| Average solution time (sec) | 11.75 | 11.42 | 6.89 |
| Total operating cost (SG $) | 3962 | 3969 | 4183 |

Figure 9:
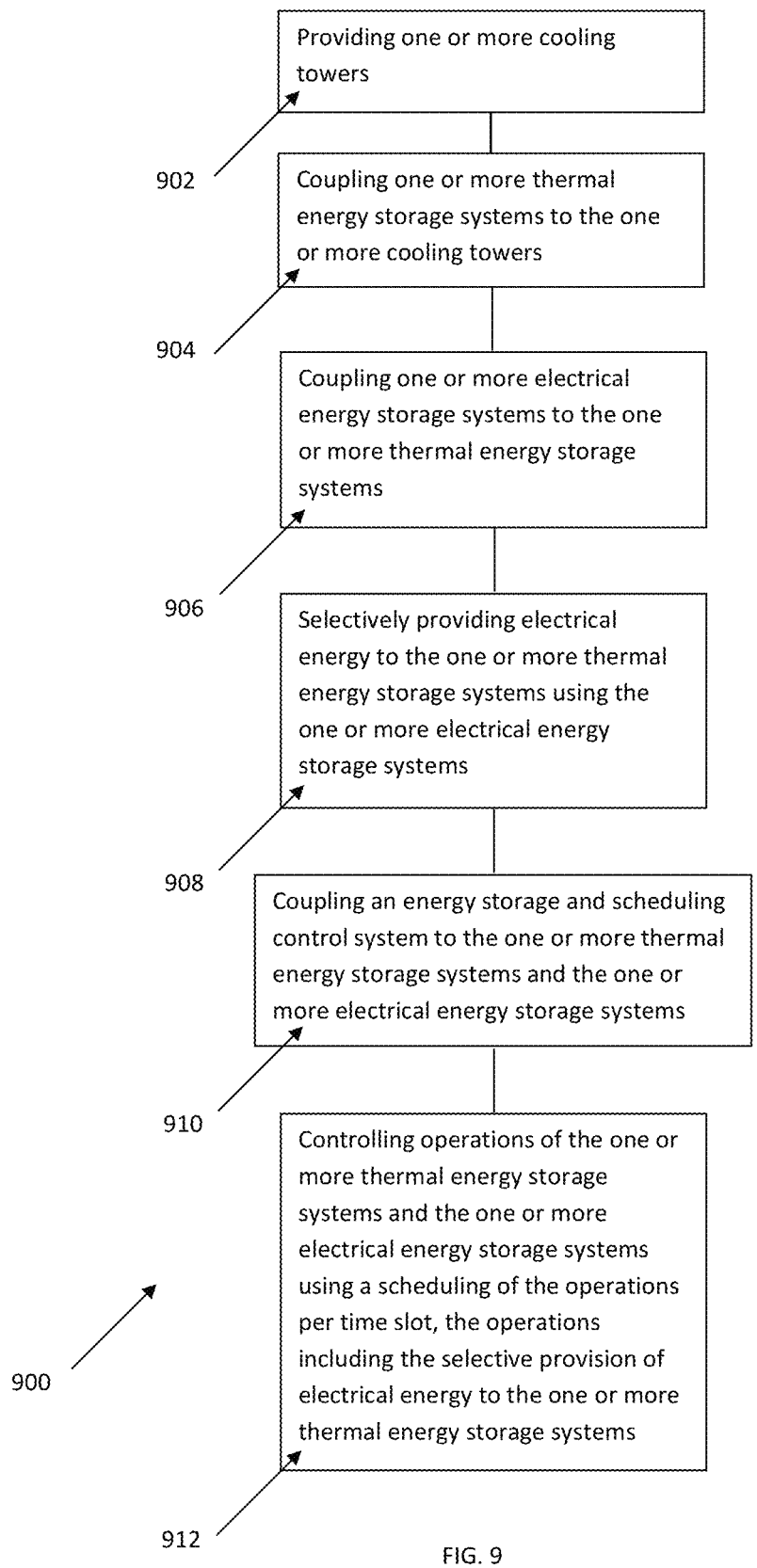
FIG. 9 is a schematic flowchart for illustrating a method of operating a cooling plant system in an exemplary embodiment.

FIG. 9 is a schematic flowchart 900 for illustrating a method of operating a cooling plant system in an exemplary embodiment. At step 902, one or more cooling towers are provided. At step 904, one or more thermal energy storage systems are coupled to the one or more cooling towers. At step 906, one or more electrical energy storage systems are coupled to the one or more thermal energy storage systems. At step 908, electrical energy is selectively provided to the one or more thermal energy storage systems using the one or more electrical energy storage systems. At step 910, an energy storage and scheduling control system is coupled to the one or more thermal energy storage systems and the one or more electrical energy storage systems. At step 912, operations of the one or more thermal energy storage systems and the one or more electrical energy storage systems are controlled using a scheduling of the operations per time slot, the operations including the selective provision of electrical energy to the one or more thermal energy storage systems.

In some embodiments, also disclosed is a non-transitory computer readable storage medium having stored thereon instructions that, when executed by a computing device, cause the computing device to perform a method for operating a cooling plant system, the method comprising coupling one or more thermal energy storage systems to one or more cooling towers, coupling one or more electrical energy storage systems to the one or more thermal energy storage systems, selectively providing electrical energy to the one or more thermal energy storage systems using the one or more electrical energy storage systems, coupling an energy storage and scheduling control system to the one or more thermal energy storage systems and the one or more electrical energy storage systems, and controlling operations of the one or more thermal energy storage systems and the one or more electrical energy storage systems using a scheduling of the operations per time slot, the operations including the step of selectively providing electrical energy to the one or more thermal energy storage systems.

In some embodiments, for the non-transitory computer readable storage medium, the method may further comprise receiving, using a scheduling module of the energy storage and scheduling control system, component models based on the one or more cooling towers, the one or more thermal energy storage systems and the one or more electrical energy storage systems; obtaining data from the one or more cooling towers, the one or more thermal energy storage systems and the one or more electrical energy storage systems; and optimising the scheduling of the operations per time slot based on the component models and the data obtained from the one or more cooling towers, the one or more thermal energy storage systems and the one or more electrical energy storage systems.

In some embodiments, for the non-transitory computer readable storage medium, the method may further comprise using a modelling module of the energy storage and scheduling control system to obtain the component models based on the one or more cooling towers, the one or more thermal energy storage systems and the one or more electrical energy storage systems.

In some embodiments, for the non-transitory computer readable storage medium, the method may further comprise optimising the scheduling based on subjecting the component models to cost constraints and minimising a total net cost based on the component models at the energy storage and scheduling control system.

In some embodiments, for the non-transitory computer readable storage medium, the method may further comprise optimising the scheduling based on the component models in a stepwise manner at the energy storage and scheduling control system.

In some embodiments, for the non-transitory computer readable storage medium, the method may further comprise providing frequency regulation to a power grid using the one or more electrical energy storage systems, based on the scheduling of the operations per time slot provided by the energy storage and scheduling control system to the one or more electrical energy storage systems.

In some embodiments, for the non-transitory computer readable storage medium, the method may further comprise providing a contingency reserve service to a power grid using the one or more electrical energy storage systems to compliment the one or more thermal energy storage systems in case of a contingency, based on the scheduling of the operations per time slot provided by the energy storage and scheduling control system to the one or more electrical energy storage systems.

In the described exemplary embodiments, a joint optimisation and scheduling platform for a cooling system with ISSs and ESSs is disclosed. In the described exemplary embodiments, through the synergy of a proposed parameterised modelling module, joint optimisation and scheduling module, and the data analytic and predictive module, a district cooling system may be operated in a cost-effective manner. This may contribute to a significant accumulative cost reduction through the continuous operation of such cooling systems. Such a scheduler may become highly desirable for enabling reliable and economic cooling systems where both ISSs and ESSs are employed.

In some exemplary embodiments, the energy storage and scheduling control system is configured to optimise the scheduling via rigorous modelling of the cooling plant system components, operations, objectives and constraints, instead of scheduling the one or more ISSs and the one or more ESSs based on empirical insights which may be inefficient under general conditions. In some exemplary embodiments, the energy storage and scheduling control system is configured to optimise the operating cost of the cooling plant system while satisfying operational and reliability constraints. These constraints may include treating the dynamics of ISSs and ESSs, the interactions between them, the associated operational constraints, and the service desirables (including reliability concerns) as constraints of the optimisation. The constraints may also include making the electricity cost of operating the cooling plant system as part of the optimisation. This, together with the above-mentioned constraints, may constitute the optimisation model described for the cooling plant system. In some exemplary embodiments, the constraints may further include solving an optimisation problem by first transforming and approximating it into standard ones (problems) where the approximation is conducted with minimum sacrifice of optimality based on analytical insights into the optimisation model.

With the described exemplary embodiments comprising a general modelling module (e.g. a parameterised modelling module 202 of FIG. 2B) and an optimisation algorithm module (e.g. a joint scheduling and optimisation module 204 of FIG. 2B), reliability and/or the economics of a cooling plant system (e.g. a district cooling system) may be improved by jointly optimising the schedules of one or more thermal energy storage systems (TESSs; e.g. thermal ice storage systems (ISSs)), one or more electrical energy storage systems (EESS; e.g. battery energy storage systems (ESSs)) and/or one or more cooling towers (CTs) making up parts of the cooling plant system. The method of jointly optimising the schedules described in exemplary embodiments relies on e.g. rigorous models of ISSs, ESSs, CTs and their services (from e.g. the parameterised modelling module 202 of FIG. 2B), and data from a data collection and prediction module (e.g. from a data analytic and predictive module 206 of FIG. 2B). In various exemplary embodiments, optimisation is periodically defined over a rolling time horizon, and may be aimed at minimising the electric cost of operating the cooling plant system under various operational constraints while meeting the cooling demands and committing to the grid services which include e.g. frequency regulation and being a spinning/contingency reserve. The method of jointly optimising the schedules described in exemplary embodiments also provides an efficient solution approach to online solving the optimisation problem within a limited amount of time. In various exemplary embodiments, the joint optimisation and scheduling may allow the cooling plant system to dispatch ISSs and ESSs in a near optimal way such that the operating cost of the cooling plant system is minimised in the short run and significantly reduced in the long run. In various exemplary embodiments, the reliability of the cooling plant system may be enhanced as a result of respecting strong reliability constraints imposed on the cooling plant system.

With the described exemplary embodiments, reliability and/or economics of a cooling plant system which is equipped with ISSs and ESSs that provide frequency regulation and contingency reserve to the grid may be improved. The inventors have addressed technical challenges that may be faced in arriving at the described exemplary embodiments that may include, developing a mathematical model of each component based on the physics of the operational data, and to integrate component models into a complete optimisation model, coordinating the ice thermal and battery energy storage which participate in ancillary markets optimally, and solving the mixed-integer joint scheduling problem to afford an online solution.

Next, with the described exemplary embodiments, a systematic solution to optimally integrate battery energy storage systems (ESSs) and thermal ice storage systems (ISSs) which are deployed in a district cooling plant may be provided. In the described exemplary embodiments, the ESSs may be used to shift the peak electric demand, offer frequency regulation service to the grid, and to assist the ISSs in offering contingency reserve service to the grid.

In various exemplary embodiments, ESSs may be a viable option to enhance the electrical reliability of a system, including a cooling plant system. In various exemplary embodiments, ESSs are capable of storing electrical energy that may be consumed to support e.g. chillers and ISSs when there is a lack of electricity or when the electricity price is high i.e., there is a selective provision of electrical energy. In various exemplary embodiments, the ESSs may function as a backup power source and this may improve the reliability of the cooling plant system. In various exemplary embodiments, the ESSs may also serve the function of storing energy for use e.g. when the electricity price is low and supplying energy when the price is high, which may bring additional economic benefits similar to ISSs except for the different form of performing energy arbitrage. The economic benefit may be further increased if the ESSs are designed and operated to provide additional services such as frequency regulation, demand charge reduction, etc. This may become more apparent as the prices of ESSs decline. It is recognised that the selective provision of electrical energy by the ESSs may be controlled by a scheduling provided by a scheduling module (e.g. a joint optimisation and scheduling module 204 of FIG. 2B).

The described exemplary embodiments may make it possible to utilise the advantages of the two types of energy storage systems (e.g., ISSs and ESSs) for reduced operating/energy cost and improved system reliability in an emerging application such as in the simultaneous use of ISSs and ESSs in a cooling plant system.

The inventors have recognised that the simultaneous use of ISSs and ESSs has the potential to enhance both reliability and economics of a cooling plant system. The inventors have recognised that the potential to be realised is dependent on how the ISSs and ESSs are managed/scheduled e.g. when the cooling demand allocated to a cooling plant system varies in a complex way.

The inventors have recognised that previous problems treated in the conventional art are much simpler than (and are special cases of) the problems being considered in recent district cooling plants with ISSs that are operated by more advanced and efficient chillers. In each ISS, an ice storage tank is associated with a unique brine chiller, and together they can switch between four working modes, i.e., the series chilling mode, parallel chilling mode, ice making mode, and idle mode. Different modes have different characteristics of energy consumption and are associated with different operational constraints. This makes the modelling more complicated and the scheduling more challenging.

Further to the above, the inclusion of ESSs with grid service functions, in particular, with support to frequency regulation and contingency reserve service, adds to the scheduling complexity posed to the inventors and makes the problem at hand unique. For example, ESSs may have to be charged and discharged appropriately in order to shave the peak power demand and shift the consumption from high to low price periods. Simultaneously, ESSs may be desired to assist the ISSs in offering a contingency reserve in order to satisfy tight service requirements. Therefore, the inventors have recognised that the scheduling of the ESSs is desirable to be optimised together (or jointly) with those of the ISSs. However, the inventors have recognised that as the ESSs may be used to participate in grid services for making additional profits under various operational constraints, the joint scheduling of ESSs and ISSs become very complex. In practice, the inventors have recognised that one possible solution may be to use another separate heuristic algorithm to schedule the ESSs. However, the lack of coordination between the two kinds of scheduling and the lack of rigorous optimisations may easily ruin the economic viability of a combined solution, potentially resulting in a failure of the investment.

Therefore, the inventors have recognised that joint scheduling of ISSs and ESSs brings challenges and there is a demand for developing optimal or near optimal scheduling solutions so that both the overall economics and the reliability of the cooling system may be improved. In this regard, the described exemplary embodiments may provide one solution.

The described exemplary embodiments may provide a rigorous mathematical modelling of each component of the district cooling system. With the described exemplary embodiments, a smooth integration and near-optimal joint scheduling of ISSs and ESSs with regulation and contingency reserve support to the grid may thus be provided. Further, e.g. with the described exemplary embodiments, the total electric cost of operating the cooling system may be reduced significantly.

In the described exemplary embodiments, various functions (described below) may work collectively to ensure that the schedules of the one or more ISSs, the one or more ESSs and/or the one or more CTs are jointly optimised even when the chilling demand allocated to a cooling plant system, the electricity price, and the ancillary service market prices experience significant variations/fluctuations.

In various exemplary embodiments, one function may be to develop a joint and accurate mathematical model for a cooling plant system with ISSs, ESSs, and CTs which participate in regulation and reserve markets which integrates the dynamics, constraints, and costs-benefits associated with the operation of each component and in particular, that of the one or more ESSs and/or the one or more ISSs, of the cooling plant system. The model may capture that e.g. a cooling plant system uses ESSs to participate in a frequency regulation market, and uses ISSs together with ESSs to participate in a contingency reserve market. In various exemplary embodiments, the model parameters are identified from historical operation data or new experiment data.

In various exemplary embodiments, a modelling module such as a parameterised modelling module is in charge of the above function. In principle, the more accurate the models are, the better the performance. As the actual systems are often considerably different from the generic models (if any) provided by a producer, it may be recommended to obtain accurate models of each component from actual operational data. If no historical operational data is available with a device/unit, then offline experiments may be conducted under realistic conditions. The experimental data may then be used to tailor the model structure and to obtain accurate model parameters. In various exemplary embodiments, the models may be sufficiently simple. Typically, actual systems have nonlinear dynamics and consequently, the developed models are nonlinear. The inventors have recognised that nonlinear models may pose challenges to optimisation which may either prevent finding a good optimal solution or make an online solution near impossible. To address this concern, approximations may be performed for obtaining practically viable optimisation models in the parameterised modelling module. For example, piece-wise linear or quadratic models may be adopted to fit the operational data, depending on whether accuracy or complexity is of a primary concern.

The various exemplary embodiments may differ from existing literature in the comprehensive modelling of the functioning and services of each key component of a cooling plant system with multiple ISSs and ESSs and also the joint modelling of the couplings and interactions in between the various components. The various exemplary embodiments offer joint modelling of one or more ISSs, ESSs and CTs respectively, which includes the use of detailed models of the chilled water pumps, chilled brine pumps, brine chillers, ice storage tanks, cooling fans, batteries, as well as the detailed models of the supported services to offer chilled water, to reduce electricity bill, and to participate in the frequency regulation and spinning/contingency reserve markets. Since the couplings and interactions become complex when each component involved is to satisfy various operational constraints, the modelling is challenging, and the joint model may constitute a significant innovation.

In various exemplary embodiments, another function may be to jointly optimsze the schedules of the one or more ISSs, the one or more ESSs and/or the one or more CTs through a near-optimal scheduler (or using a sub-optimal scheduling) based on the above-mentioned mathematical model and forecasted data. This may serve to minimise the net operating cost (i.e., the total operating cost minus the payments received) computed for a rolling planning time horizon subject to various kinds of system constraints, as well as both plant-wide and grid service requirements. In various exemplary embodiments, this may also serve to dispatch/deploy the one or more ISSs, ESSs and CTs respectively.

In various exemplary embodiments, a scheduling module such as a joint optimisation and scheduling module is in charge of this functioning. The module may be configured to receive one or more inputs such as the cooling plant system model and the real-time measured/forecasted data, and may be configured to conduct optimisation of the schedules of the one or more ISSs, ESSs and/or CTs respectively. In various exemplary embodiments, the schedules cover multiple future time slots, and only the schedule of the first time slot is implemented. For example, the module may be configured to make decisions on the following items for each time slot under planning—the working mode of each ISS and the corresponding chilling capacity to be activated, the working mode of each ESS and the corresponding charge/discharge rate to support the committed services, and the working mode of each CT and the corresponding cooling capacity to be activated. These schedules for the first time slot is transmitted by the joint optimisation and scheduling module to the management systems of the corresponding units, which may then be operated/executed.

The various exemplary embodiments may differ from existing literature in the joint scheduling of the one or more ISSs, ESSs and CTs respectively using a rolling-horizon optimisation approach. For example, the ISSs may be scheduled to work in a most economic mode to provide a desired amount of chilled water or ensure a sufficient storage of ice, the CTs may be scheduled to provide sufficient cool water to disperse the heats produced in the ISSs, and the ESSs may be scheduled to reduce the electric cost of the whole cooling plant by shifting the consumption from the periods of high electricity prices to those of low electricity prices or by participating in grid services which generate profits. In various exemplary embodiments, the three types of scheduling are coupled with each other and this makes the joint scheduling challenging. Since such joint scheduling may be unobtainable from a straightforward extension of existing schemes, the inventors have recognised that the developed scheduling module described in various exemplary embodiments may constitute another significant innovation.

In various exemplary embodiments, yet another function may be to develop a computationally efficient solution approach by appropriately decomposing the mixed-integer program in the above-mentioned scheduler into simpler ones while sacrificing the optimality to a minimum extent.

In various exemplary embodiments, the joint optimisation and scheduling module is sufficiently efficient to admit an online solution for dispatching the ISSs, ESSs and CTs periodically. If the computational time is too long, then the module may undesirably fail to update the schedules in terms of time and may consequently make the cooling plant system unable to meet the chilling demand, which may generate severe consequences to the application. Thus, the inventors have recognised that a joint optimisation and scheduling module is to be designed such that online/timely solutions may be obtained (depending on the period of updating the schedules; here, 'online' may mean a time period from minutes to one hour). In various exemplary embodiments, since scheduling involves decisions on discrete working modes of ISSs and binary operation modes of ESSs and CTs, the optimisation problem may at best be a mixed-integer linear program.

In various exemplary embodiments, another function may be to predict the different types of data desired within each planning time horizon using various tailored prediction methods. This may make use of one or more particular features of each individual type of data and may be aimed at minimising prediction errors. The predicted data may be inputted to the above-mentioned scheduler to make the optimisation concrete and ready to solve.

In various exemplary embodiments, a data module such as a data analytic and predictive module is in charge of this functioning. The module may be designed/configured such that the forecast errors are as small as possible. To that end, the measurement data may be filtered before use, which removes faulty data and mitigates measurement noises, and the prediction algorithms may be tailored based on the features of the data under consideration. For example, the algorithm for predicting the electricity prices is different from that for forecasting the chilling demand. This is because the patterns of the two data series can be significantly different, and the unique features of a data series are utilised to develop suitable forecast algorithms.

The various exemplary embodiments may differ from existing literature in the use of multiple prediction methods that are tailored for the corresponding operation data which is unique to specific parts of the application under consideration. For example, Long Short Term Memory networks (LSTMs), which is a kind of Recursive Neural Networks (RNNs), may be used to forecast the chilling load demand which exhibits strong temporal (hourly and daily) correlations in the demand series. A method that combines the power of the Artificial Neural Networks (ANNs) and the efficiency of the Box-Jenkins SARIMA-type model and the Multiple Regressions may be used to predict the wholesale electricity price and also the frequency regulation and spinning/contingency reserve prices, which may have certain dynamics and may be subject to uncertainties.

In various exemplary embodiments, the parameterised modelling module may be configured to take into account different types of ISSs, ESSs and CTs. In other words, there may be different types of ISSs used for the same cooling system, and similarly, different ESSs and CTs may be used. This may be especially useful when hybrid types of ESSs are adopted to complement each other, which the inventors have recognised to be more economic than employing a single type of ESS. The described exemplary embodiments may be tailored accordingly to handle general cases (or systems) by incorporating appropriate models for each type of these system components.

The system and method of described exemplary embodiments cover the main components of a cooling plant system, i.e., ISSs, ESSs and CTs. However, it will be appreciated that the exemplary embodiments are not limited as such. One possible variation of the method is to handle special cooling systems without ESSs or with the ISSs restricted to certain working modes, e.g., the degenerated mode of working as an ordinary water chiller without making any ice, as special cases.

As another possible variation, the described exemplary embodiments may further comprise water chillers that may be integrated into the cooling plant system with ISSs, ESSs and CTs. This may result in a more general cooling plant system with wider applications and implications. The optimisation platform/modules of described exemplary embodiments may be generalised to handle more general cooling plant systems by e.g. incorporating mathematical models of the water chillers and also extending the data collection and prediction unit to retrieve data from these chillers.

In the above described exemplary embodiments, the resulting scheduling optimisation problem may have more binary decision variables and more operational constraints.

Therefore, in such exemplary embodiments, the scheduling optimiser may have to solve a more challenging problem. In such exemplary embodiments, for efficient computation, the approach of decomposing the problem into smaller ones may be applied. For example, if there are comparatively many water chillers, it may be desirable to first determine the optimal aggregate chilling demands distributed to the water chillers and to the ISSs. Subsequently, the scheduling of water chillers and that of ISSs may be optimised in parallel. In this manner, the extra computational burden caused by the additional water chillers may be resolved.

The terms "coupled" or "connected" as used in this description are intended to cover both directly connected or connected through one or more intermediate means, unless otherwise stated.

The description herein may be, in certain portions, explicitly or implicitly described as algorithms and/or functional operations that operate on data within a computer memory or an electronic circuit. These algorithmic descriptions and/or functional operations are usually used by those skilled in the information/data processing arts for efficient description. An algorithm is generally relating to a self-consistent sequence of steps leading to a desired result. The algorithmic steps can include physical manipulations of physical quantities, such as electrical, magnetic or optical signals capable of being stored, transmitted, transferred, combined, compared, and otherwise manipulated.

Further, unless specifically stated otherwise, and would ordinarily be apparent from the following, a person skilled in the art will appreciate that throughout the present specification, discussions utilising terms such as "scanning", "calculating", "determining", "replacing", "generating", "initialising", "outputting", and the like, refer to action and processes of an instructing processor/computer system, or similar electronic circuit/device/component, that manipulates/processes and transforms data represented as physical quantities within the described system into other data similarly represented as physical quantities within the system or other information storage, transmission or display devices etc.

The description also discloses relevant device/apparatus for performing the steps of the described methods. Such apparatus may be specifically constructed for the purposes of the methods, or may comprise a general purpose computer/processor or other device selectively activated or reconfigured by a computer program stored in a storage member. The algorithms and displays described herein are not inherently related to any particular computer or other apparatus. It is understood that general purpose devices/machines may be used in accordance with the teachings herein. Alternatively, the construction of a specialised device/apparatus to perform the method steps may be desired.

In addition, it is submitted that the description also implicitly covers a computer program, in that it would be clear that the steps of the methods described herein may be put into effect by computer code. It will be appreciated that a large variety of programming languages and coding can be used to implement the teachings of the description herein. Moreover, the computer program if applicable is not limited to any particular control flow and can use different control flows without departing from the scope of the invention.

Furthermore, one or more of the steps of the computer program if applicable may be performed in parallel and/or sequentially. Such a computer program if applicable may be stored on any computer readable medium. The computer readable medium may include storage devices such as magnetic or optical disks, memory chips, or other storage devices suitable for interfacing with a suitable reader/general purpose computer. In such instances, the computer readable storage medium is non-transitory. Such storage medium also covers all computer-readable media e.g. medium that stores data only for short periods of time and/or only in the presence of power, such as register memory, processor cache and Random Access Memory (RAM) and the like. The computer readable medium may even include a wired medium such as exemplified in the Internet system, or wireless medium such as exemplified in bluetooth technology. The computer program when loaded and executed on a suitable reader effectively results in an apparatus that can implement the steps of the described methods.

The exemplary embodiments may also be implemented as hardware modules. A module is a functional hardware unit designed for use with other components or modules. For example, a module may be implemented using digital or discrete electronic components, or it can form a portion of an entire electronic circuit such as an Application Specific Integrated Circuit (ASIC). A person skilled in the art will understand that the example embodiments can also be implemented as a combination of hardware and software modules.

Additionally, when describing some embodiments, the disclosure may have disclosed a method and/or process as a particular sequence of steps. However, unless otherwise required, it will be appreciated the method or process should not be limited to the particular sequence of steps disclosed. Other sequences of steps may be possible. The particular order of the steps disclosed herein should not be construed as undue limitations. Unless otherwise required, a method and/or process disclosed herein should not be limited to the steps being carried out in the order written. The sequence of steps may be varied and still remain within the scope of the disclosure.

Further, in the description herein, the word "substantially" whenever used is understood to include, but not restricted to, "entirely" or "completely" and the like. In addition, terms such as "comprising", "comprise", and the like whenever used, are intended to be non-restricting descriptive language in that they broadly include elements/components recited after such terms, in addition to other components not explicitly recited. For an example, when "comprising" is used, reference to a "one" feature is also intended to be a reference to "at least one" of that feature. Terms such as "consisting", "consist", and the like, may, in the appropriate context, be considered as a subset of terms such as "comprising", "comprise", and the like. Therefore, in embodiments disclosed herein using the terms such as "comprising", "comprise", and the like, it will be appreciated that these embodiments provide teaching for corresponding embodiments using terms such as "consisting", "consist", and the like. Further, terms such as "about", "approximately" and the like whenever used, typically means a reasonable variation, for example a variation of +1-5% of the disclosed value, or a variance of 4% of the disclosed value, or a variance of 3% of the disclosed value, a variance of 2% of the disclosed value or a variance of 1% of the disclosed value.

Furthermore, in the description herein, certain values may be disclosed in a range. The values showing the end points of a range are intended to illustrate a preferred range. Whenever a range has been described, it is intended that the range covers and teaches all possible sub-ranges as well as individual numerical values within that range. That is, the end points of a range should not be interpreted as inflexible limitations. For example, a description of a range of 1% to 5% is intended to have specifically disclosed sub-ranges 1% to 2%, 1% to 3%, 1% to 4%, 2% to 3% etc., as well as individually, values within that range such as 1%, 2%, 3%, 4% and 5%. The intention of the above specific disclosure is applicable to any depth/breadth of a range.

Figure 8:
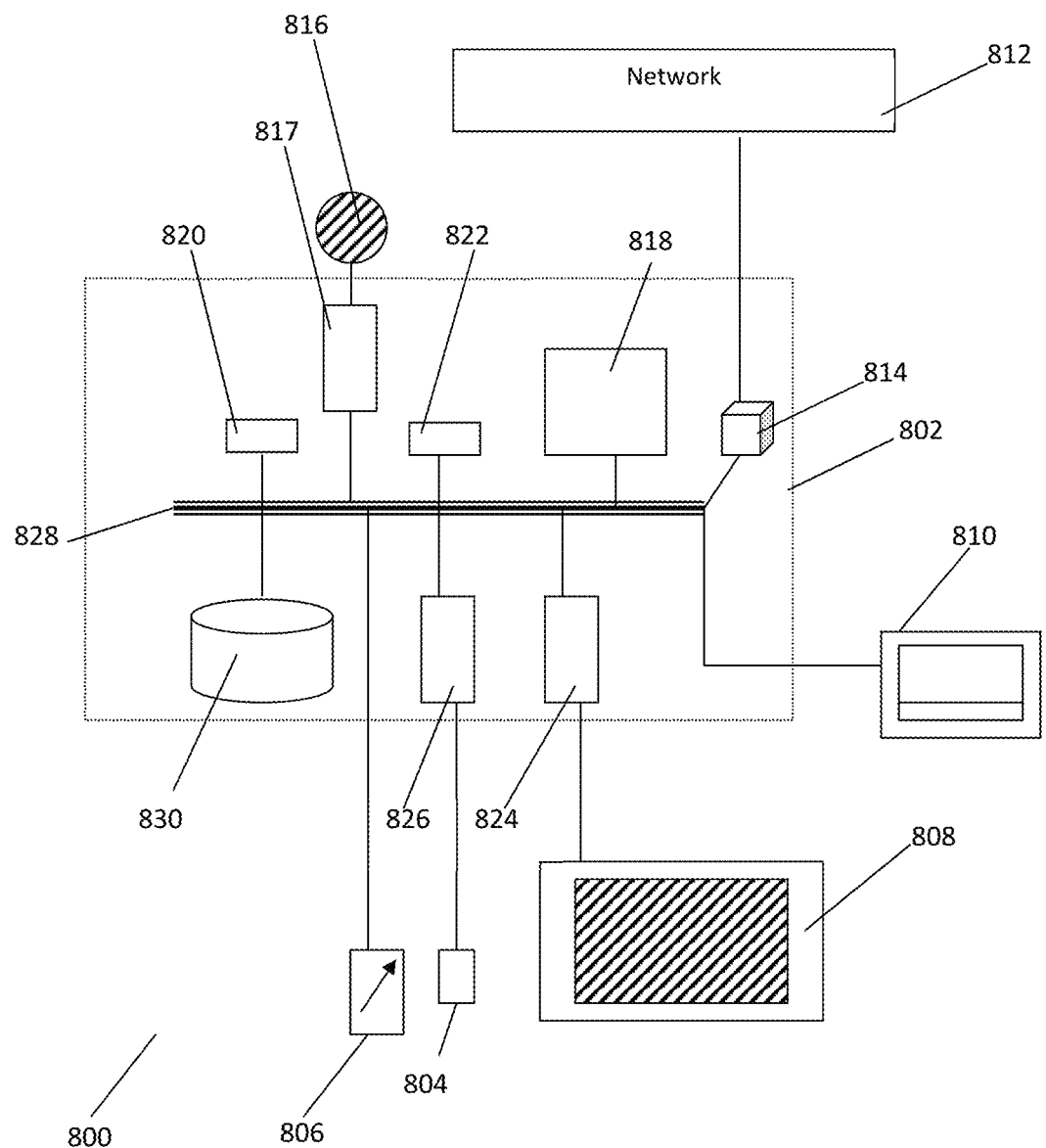
FIG. 8 is a schematic drawing of a computer system suitable for implementing an example embodiment.

Different exemplary embodiments can be implemented in the context of data structure, program modules, program and computer instructions executed in a computer implemented environment. A general purpose computing environment is briefly disclosed herein. One or more exemplary embodiments may be embodied in one or more computer systems, such as is schematically illustrated in FIG. 8.

One or more exemplary embodiments may be implemented as software, such as a computer program being executed within a computer system 800, and instructing the computer system 800 to conduct a method of an exemplary embodiment.

The computer system 800 comprises a computer unit 802, input modules such as a keyboard 804 and a pointing device 806 and a plurality of output devices such as a display 808, and printer 810. A user can interact with the computer unit 802 using the above devices. The pointing device can be implemented with a mouse, track ball, pen device or any similar device. One or more other input devices (not shown) such as a joystick, game pad, satellite dish, scanner, touch sensitive screen or the like can also be connected to the computer unit 802. The display 808 may include a cathode ray tube (CRT), liquid crystal display (LCD), field emission display (FED), plasma display or any other device that produces an image that is viewable by the user.

The computer unit 802 can be connected to a computer network 812 via a suitable transceiver device 814, to enable access to e.g. the Internet or other network systems such as Local Area Network (LAN) or Wide Area Network (WAN) or a personal network. The network 812 can comprise a server, a router, a network personal computer, a peer device or other common network node, a wireless telephone or wireless personal digital assistant. Networking environments may be found in offices, enterprise-wide computer networks and home computer systems etc. The transceiver device 814 can be a modem/router unit located within or external to the computer unit 802, and may be any type of modem/router such as a cable modem or a satellite modem.

It will be appreciated that network connections shown are exemplary and other ways of establishing a communications link between computers can be used. The existence of any of various protocols, such as TCP/IP, Frame Relay, Ethernet, FTP, HTTP and the like, is presumed, and the computer unit 802 can be operated in a client-server configuration to permit a user to retrieve web pages from a web-based server. Furthermore, any of various web browsers can be used to display and manipulate data on web pages.

The computer unit 802 in the example comprises a processor 818, a Random Access Memory (RAM) 820 and a Read Only Memory (ROM) 822. The ROM 822 can be a system memory storing basic input/output system (BIOS) information. The RAM 820 can store one or more program modules such as operating systems, application programs and program data. The processor 818 may implement a scheduling module and/or a data module and/or a modelling module in different exemplary embodiments.

The computer unit 802 further comprises a number of Input/Output (I/O) interface units, for example I/O interface unit 824 to the display 808, and I/O interface unit 826 to the keyboard 804. The components of the computer unit 802 typically communicate and interface/couple connectedly via an interconnected system bus 828 and in a manner known to the person skilled in the relevant art. The bus 828 can be any of several types of bus structures including a memory bus or memory controller, a peripheral bus, and a local bus using any of a variety of bus architectures.

It will be appreciated that other devices can also be connected to the system bus 828. For example, a universal serial bus (USB) interface can be used for coupling a video or digital camera to the system bus 828. An IEEE 1394 interface may be used to couple additional devices to the computer unit 802. Other manufacturer interfaces are also possible such as FireWire developed by Apple Computer and i.Link developed by Sony. Coupling of devices to the system bus 828 can also be via a parallel port, a game port, a PCI board or any other interface used to couple an input device to a computer. It will also be appreciated that, while the components are not shown in the figure, sound/audio can be recorded and reproduced with a microphone and a speaker. A sound card may be used to couple a microphone and a speaker to the system bus 828. It will be appreciated that several peripheral devices can be coupled to the system bus 828 via alternative interfaces simultaneously.

An application program can be supplied to the user of the computer system 800 being encoded/stored on a data storage medium such as a CD-ROM or flash memory carrier. The application program can be read using a corresponding data storage medium drive of a data storage device 830. The data storage medium is not limited to being portable and can include instances of being embedded in the computer unit 802. The data storage device 830 can comprise a hard disk interface unit and/or a removable memory interface unit (both not shown in detail) respectively coupling a hard disk drive and/or a removable memory drive to the system bus 828. This can enable reading/writing of data. Examples of removable memory drives include magnetic disk drives and optical disk drives. The drives and their associated computer-readable media, such as a floppy disk provide non-volatile storage of computer readable instructions, data structures, program modules and other data for the computer unit 802. It will be appreciated that the computer unit 802 may include several of such drives. Furthermore, the computer unit 802 may include drives for interfacing with other types of computer readable media.

The application program is read and controlled in its execution by the processor 818. Intermediate storage of program data may be accomplished using RAM 820. The method(s) of the example embodiments can be implemented as computer readable instructions, computer executable components, or software modules. One or more software modules may alternatively be used. These can include an executable program, a data link library, a configuration file, a database, a graphical image, a binary data file, a text data file, an object file, a source code file, or the like. When one or more computer processors execute one or more of the software modules, the software modules interact to cause one or more computer systems to perform according to the teachings herein.

The operation of the computer unit 802 can be controlled by a variety of different program modules. Examples of program modules are routines, programs, objects, components, data structures, libraries, etc. that perform particular tasks or implement particular abstract data types. The example embodiments may also be practiced with other computer system configurations, including handheld devices, multiprocessor systems, microprocessor-based or programmable consumer electronics, network PCs, minicomputers, mainframe computers, personal digital assistants, mobile telephones and the like. Furthermore, the example embodiments may also be practiced in distributed computing environments where tasks are performed by remote processing devices that are linked through a wireless or wired communications network. In a distributed computing environment, program modules may be located in both local and remote memory storage devices.

In the description, references have been made to cooling towers (CTs). It will be appreciated that the exemplary embodiments are not limited to a conventional understanding of a CT and the references made are understood to be broadly comprising output devices/members for providing a cooling medium.

It will be appreciated by a person skilled in the art that other variations and/or modifications may be made to the specific embodiments without departing from the scope of the invention as broadly described. For example, in the description herein, features of different exemplary embodiments may be mixed, combined, interchanged, incorporated, adopted, modified, included etc. or the like across different exemplary embodiments. The present embodiments are, therefore, to be considered in all respects to be illustrative and not restrictive.

The invention claimed is:

1. A cooling plant system, the system comprising,
one or more cooling towers;
one or more thermal energy storage systems coupled to the one or more cooling towers;
one or more electrical energy storage systems, the one or more electrical energy storage systems being coupled to the one or more thermal energy storage systems for selectively providing electrical energy to the one or more thermal energy storage systems; and
an energy storage and scheduling control system coupled to the one or more thermal energy storage systems and the one or more electrical energy storage systems, the energy storage and scheduling control system being configured to control operations of the one or more thermal energy storage systems and the one or more electrical energy storage systems via a scheduling of the operations per time slot, the operations including the selective provision of electrical energy to the one or more thermal energy storage systems.

2. The cooling plant system of claim 1, wherein the energy storage and scheduling control system comprises a scheduling module that is configured to receive component models based on the one or more cooling towers, the one or more thermal energy storage systems and the one or more electrical energy storage systems, and further configured to optimise the scheduling of the operations per time slot based on the component models and data obtained from the one or more cooling towers, the one or more thermal energy storage systems and the one or more electrical energy storage systems.

3. The cooling plant system of claim 2, wherein the energy storage and scheduling control system further comprises a modelling module to obtain the component models based on the one or more cooling towers, the one or more thermal energy storage systems and the one or more electrical energy storage systems.

4. The cooling plant system of claim 2, wherein the energy storage and scheduling control system is configured to optimise the scheduling based on subjecting the component models to cost constraints and minimising a total net cost based on the component models.

5. The cooling plant system of claim 2, wherein the energy storage and scheduling control system is configured to optimise the scheduling based on the component models in a stepwise manner.

6. The cooling plant system of claim 1, wherein the one or more electrical energy storage systems is capable of providing frequency regulation to a power grid, based on the scheduling of the operations per time slot provided by the energy storage and scheduling control system.

7. The cooling plant system of claim 1, wherein the one or more electrical energy storage systems is capable of providing a contingency reserve service to a power grid to compliment the one or more thermal energy storage systems in case of a contingency, based on the scheduling of the operations per time slot provided by the energy storage and scheduling control system.

8. A method of operating a cooling plant system, the method comprising,
providing one or more cooling towers;
coupling one or more thermal energy storage systems to the one or more cooling towers;
coupling one or more electrical energy storage systems to the one or more thermal energy storage systems;
selectively providing electrical energy to the one or more thermal energy storage systems using the one or more electrical energy storage systems;
coupling an energy storage and scheduling control system to the one or more thermal energy storage systems and the one or more electrical energy storage systems; and
controlling operations of the one or more thermal energy storage systems and the one or more electrical energy storage systems using a scheduling of the operations per time slot, the operations including the step of selectively providing electrical energy to the one or more thermal energy storage systems.

9. The method of claim 8, further comprising receiving, using a scheduling module of the energy storage and scheduling control system, component models based on the one or more cooling towers, the one or more thermal energy storage systems and the one or more electrical energy storage systems;
obtaining data from the one or more cooling towers, the one or more thermal energy storage systems and the one or more electrical energy storage systems; and
optimising the scheduling of the operations per time slot based on the component models and the data obtained from the one or more cooling towers, the one or more thermal energy storage systems and the one or more electrical energy storage systems.

10. The method of claim 9, further comprising using a modelling module of the energy storage and scheduling control system to obtain the component models based on the one or more cooling towers, the one or more thermal energy storage systems and the one or more electrical energy storage systems.

11. The method of claim 1, further comprising optimising the scheduling based on subjecting the component models to cost constraints and minimising a total net cost based on the component models at the energy storage and scheduling control system.

12. The method of claim 9, further comprising optimising the scheduling based on the component models in a stepwise manner at the energy storage and scheduling control system.

13. The method of claim 8, further comprising providing frequency regulation to a power grid using the one or more electrical energy storage systems, based on the scheduling of the operations per time slot provided by the energy storage and scheduling control system to the one or more electrical energy storage systems.

14. The method of claim 8, further comprising providing a contingency reserve service to a power grid using the one or more electrical energy storage systems to compliment the one or more thermal energy storage systems in case of a contingency, based on the scheduling of the operations per time slot provided by the energy storage and scheduling control system to the one or more electrical energy storage systems.

15. An energy storage and scheduling control system, the energy storage and scheduling control system,
being capable of coupling to one or more cooling towers, to one or more thermal energy storage systems and to one or more electrical energy storage systems;
the energy storage and scheduling control system being configured to control operations of the one or more thermal energy storage systems and the one or more electrical energy storage systems via a scheduling of the operations per time slot, the operations including selective provision of electrical energy to the one or more thermal energy storage systems.

16. The energy storage and scheduling control system of claim 15, wherein the energy storage and scheduling control system comprises a scheduling module being capable of receiving component models based on the one or more cooling towers, the one or more thermal energy storage systems and the one or more electrical energy storage systems, and further being capable of optimising the scheduling of the operations per time slot based on the component models and data obtained from the one or more cooling towers, the one or more thermal energy storage systems and the one or more electrical energy storage systems.

17. The energy storage and scheduling control system of claim 16, wherein the energy storage and scheduling control system further comprises a modelling module being capable of obtaining the component models based on the one or more cooling towers, the one or more thermal energy storage systems and the one or more electrical energy storage systems.

18. The energy storage and scheduling control system of claim 16, wherein the scheduling module is further being capable of optimising the scheduling based on subjecting the component models to cost constraints and minimising a total net cost based on the component models.

19. The energy storage and scheduling control system of claim 16, wherein the scheduling module is further being capable of optimising the scheduling based on the component models in a stepwise manner.

20. The energy storage and scheduling control system of claim 15, wherein the energy storage and scheduling control system is capable of controlling the one or more electrical energy storage systems to provide frequency regulation to a power grid, based on the scheduling of the operations per time slot provided by the energy storage and scheduling control system.

21. The energy storage and scheduling control system of claim 15, wherein the energy storage and scheduling control system is capable of controlling the one or more electrical energy storage systems to provide a contingency reserve service to a power grid to compliment the one or more thermal energy storage systems in case of a contingency, based on the scheduling of the operations per time slot provided by the energy storage and scheduling control system.

* * * * *